United States Patent
Hume et al.

(10) Patent No.: US 11,114,894 B2
(45) Date of Patent: Sep. 7, 2021

(54) APPARATUS SYSTEM AND METHOD OF WIRELESS ROBOT CHARGING

(71) Applicant: Sony Interactive Entertainment Inc., Tokyo (JP)

(72) Inventors: Oliver George Hume, London (GB); Robert Keith John Withey, Biggleswade (GB); Michael Eder, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 198 days.

(21) Appl. No.: 16/418,310

(22) Filed: May 21, 2019

(65) Prior Publication Data

US 2019/0363578 A1    Nov. 28, 2019

(30) Foreign Application Priority Data

May 25, 2018  (GB) ...................................... 1808620

(51) Int. Cl.
    *H02J 50/10*    (2016.01)
    *H02J 7/04*     (2006.01)
    (Continued)

(52) U.S. Cl.
    CPC .............. *H02J 50/10* (2016.02); *H02J 7/025* (2013.01); *H02J 7/04* (2013.01); *H02J 50/90* (2016.02)

(58) Field of Classification Search
    CPC ..................................................... H02J 50/10
    (Continued)

(56) References Cited

U.S. PATENT DOCUMENTS

2013/0098723 A1    4/2013   Cho
2014/0318913 A1*  10/2014   Woronowicz .......... B60M 7/003
                                                        191/10
(Continued)

FOREIGN PATENT DOCUMENTS

DE    102005053111 A1    5/2007
WO       2010105759 A1    9/2010
WO       2013068534 A2    5/2013

OTHER PUBLICATIONS

Combined Search and Examination Report for corresponding GB Application No. GB1808620.7, 4 pages, dated Nov. 15, 2018.

*Primary Examiner* — Edward Tso
*Assistant Examiner* — Ahmed H Omar
(74) *Attorney, Agent, or Firm* — Matthew B. Dernier, Esq.

(57) ABSTRACT

A charging apparatus for wireless charging of one or more robotic devices includes a power transmitting unit having a plurality of conducting wires each configured to carry a respective alternating current signal and to generate a time-varying magnetic flux when the conducting wire carries the alternating current signal, a processor configured to detect a presence or an absence of an induction coil of a robotic device within a predetermined distance of a conducting wire and to generate control data based on the result of the detection, and a control unit configured to control at least one of an amplitude and a frequency of each respective alternating current signal supplied to each of the conducting wires based on the control data, where the control unit is configured to increase at least one of an amplitude and a frequency of an alternating current signal supplied to a conducting wire in response to control data indicating the presence of the induction coil within the predetermined distance of the conducting wire.

15 Claims, 13 Drawing Sheets

(51) Int. Cl.
*H02J 7/02* (2016.01)
*H02J 50/90* (2016.01)

(58) Field of Classification Search
USPC .......................................................... 320/108
See application file for complete search history.

(56) References Cited

U.S. PATENT DOCUMENTS

2016/0183752 A1* 6/2016 Morin .................... A47L 9/2821
  134/18
2019/0036382 A1* 1/2019 Vu .......................... H02J 7/025

\* cited by examiner

APPARATUS SYSTEM AND METHOD OF WIRELESS ROBOT CHARGING

BACKGROUND OF THE INVENTION

Field of the Invention

The present invention relates to an apparatus, system and method of wireless charging, and more particularly to wireless charging of robotic devices.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Electronic devices such as smartphones, laptop computers, tablets and robotic devices require electrical power in order to perform their functions, with some functions requiring more power consumption than others. Portable devices may comprise batteries for storing chemical energy which allow functions to be performed when the device is not plugged into a power outlet by converting the stored chemical energy into electrical energy as required. Limitations associated with battery technologies mean that such portable devices have a limited period of time (battery life) in which functions can be performed before requiring recharging. In some cases, in order to extend the battery life and yield a time period of suitable duration in which useful functions can be performed, some specific functions of a portable device may be restricted. Even with recent advances in battery performance, the need to periodically recharge portable devices is a major consideration for most users.

These issues are particularly relevant in the field of robotic devices where conventional charging techniques using a wired connection may not always be suitable. Power consumption associated with driving one or more actuators of the robotic device can place significant constraints on the battery life of the robotic device thereby limiting the range of the robotic device. For robotic devices that use a docking station for recharging, the maximum distance that the device can venture from the docking station is restricted by the battery life, and in some scenarios, such as when navigating a home environment, the energy stored in the battery may be insufficient to return the robotic device to the docking station.

Means and techniques to enhance the charging of batteries of robotic devices are therefore advantageous.

The present invention seeks to provide improved charging for robotic devices.

SUMMARY OF THE INVENTION

In a first aspect, there is provided a charging apparatus for wireless charging of one or more robotic devices in accordance with claim 1.

In another aspect, there is provided a wirelessly chargeable robotic device in accordance with claim 14.

In another aspect, there is provided a system for wireless charging of one or more robotic devices in accordance with claim 16.

In another aspect, there is provided a method of wirelessly charging one or more robotic devices in accordance with claim 17.

In another aspect, there is provided computer software which, when executed by a computer, causes the computer to carry out a method of wirelessly charging one or more robotic devices in accordance with claim 18.

Further respective aspects and features of the invention are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
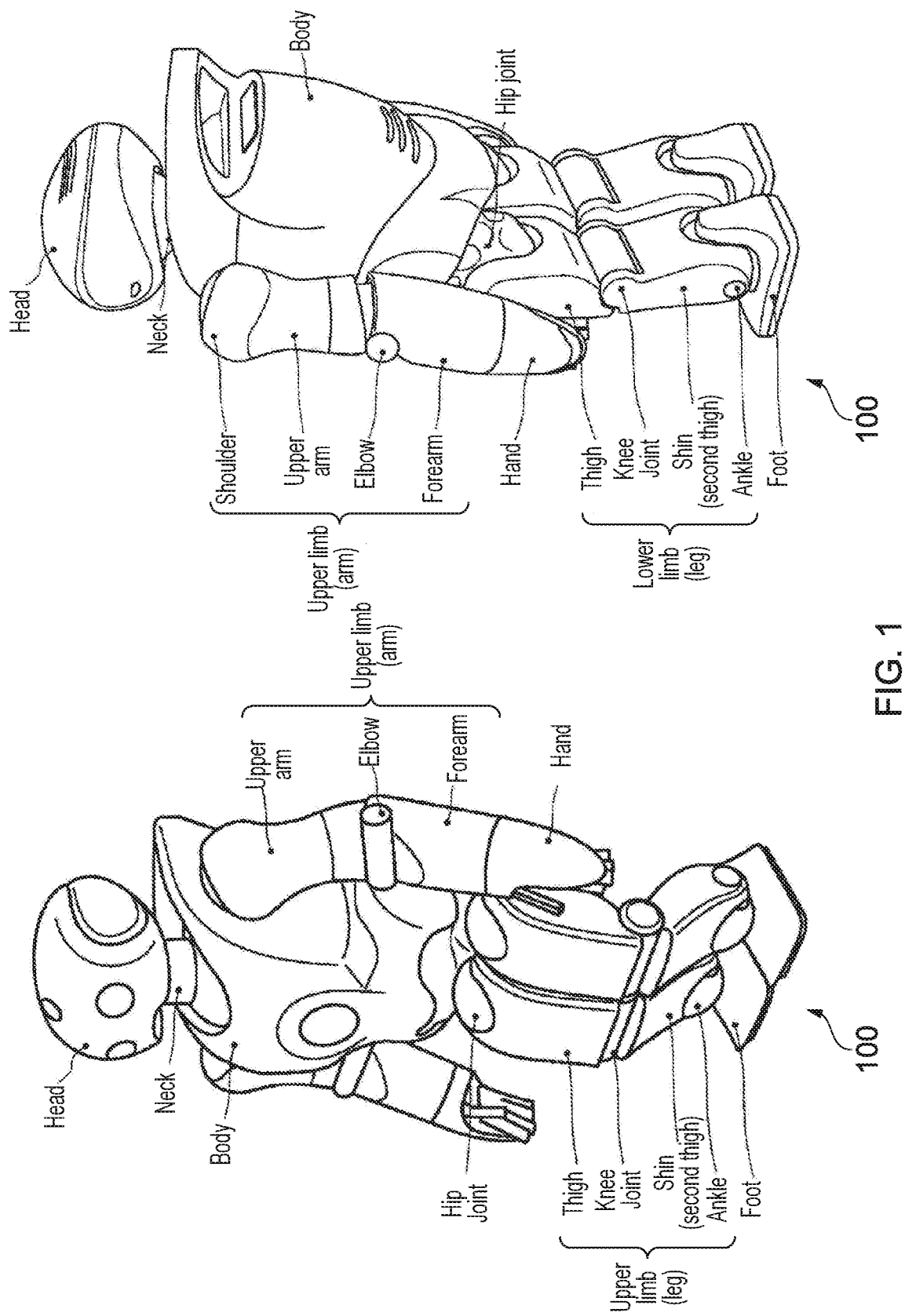
FIG. 1 is a schematic diagram showing front and rear elevations of a robot, in accordance with embodiments of the present invention.

Referring now to the drawings, wherein like reference numerals designate identical or corresponding parts throughout the several views, a robot platform 100 for implementing embodiments of the present invention may take the form of any suitable robotic device, or simulation of a robotic device, as applicable.

The terms "coupled" and "connected," along with their derivatives, may be used herein to describe structural relationships between components of the system for performing the operations herein. It should be understood that these terms are not intended as synonyms for each other. Rather, in particular embodiments, "connected" is used to indicate that two or more elements are in direct physical or electrical contact with each other while "coupled" is used to indicate two or more elements are in either direct or indirect (with other intervening elements between them) physical or electrical contact with each other, and/or that the two or more elements co-operate or communicate with each other (e.g., as in a cause an effect relationship).

In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

The robot platform may have any suitable physical features. Hence movement, where required, may be achieved by wheels, tracks, articulated limbs, internal mass displacement or any other suitable means. Manipulation, where required, maybe achieved by one or more of a mechanical hand, pincer or any other hooking or gripping system, such as a suction or electromagnetic attachment mechanism or a hook or clip, and any further optional articulation such as one or more jointed arms. Vision, where required, may be achieved by optical camera and/or infra-red camera/detector, mounted on the robot and/or located within the environment navigated by the robot. Other situational awareness systems such as ultrasound echolocation, or detection of metal tracks and/or electrically charged tracks, and proximity systems such as whiskers coupled to sensors, or pressure pads, may also be considered. Control of the robot may be provided by running suitable software instructions on a processor of the robot and/or a processor of a remote computer communicating with the robot, for example via a wireless protocol.

FIG. 1 illustrates front and rear views of an exemplary legged locomotive robot platform 100. As shown, the robot includes a body, head, right and left upper limbs, and right and left lower limbs for legged movement. A control unit 80 (not shown in FIG. 1) within the body provides a control system for the robot.

Each of the right and left lower limbs includes a thigh, knee joint, second thigh (calf/shin), ankle and foot. The lower limb is coupled by a hip joint to the bottom of the trunk. Each of the right and left upper limb includes an upper arm, elbow joint and forearm. The upper limb is coupled by a shoulder joint to each upper edge of the trunk. Meanwhile, the head is coupled by a neck joint near to the upper end centre of the trunk.

Figure 2:
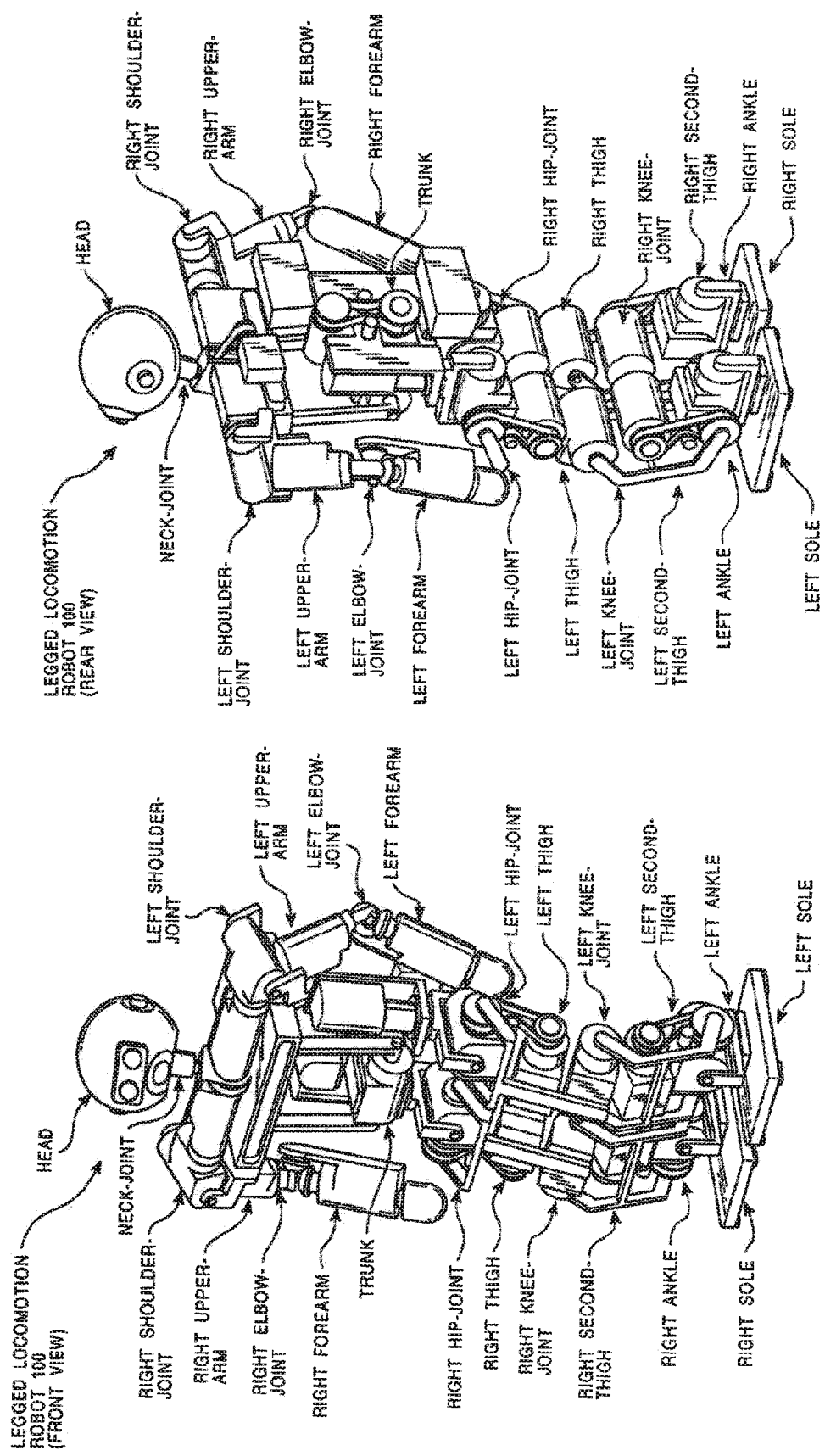
FIG. 2 is a schematic diagram showing front and rear elevations of points of articulation of a robot, in accordance with embodiments of the present invention.

FIG. 2 illustrates front and rear views of the robot, showing its points of articulation (other than the hands).

Figure 3:
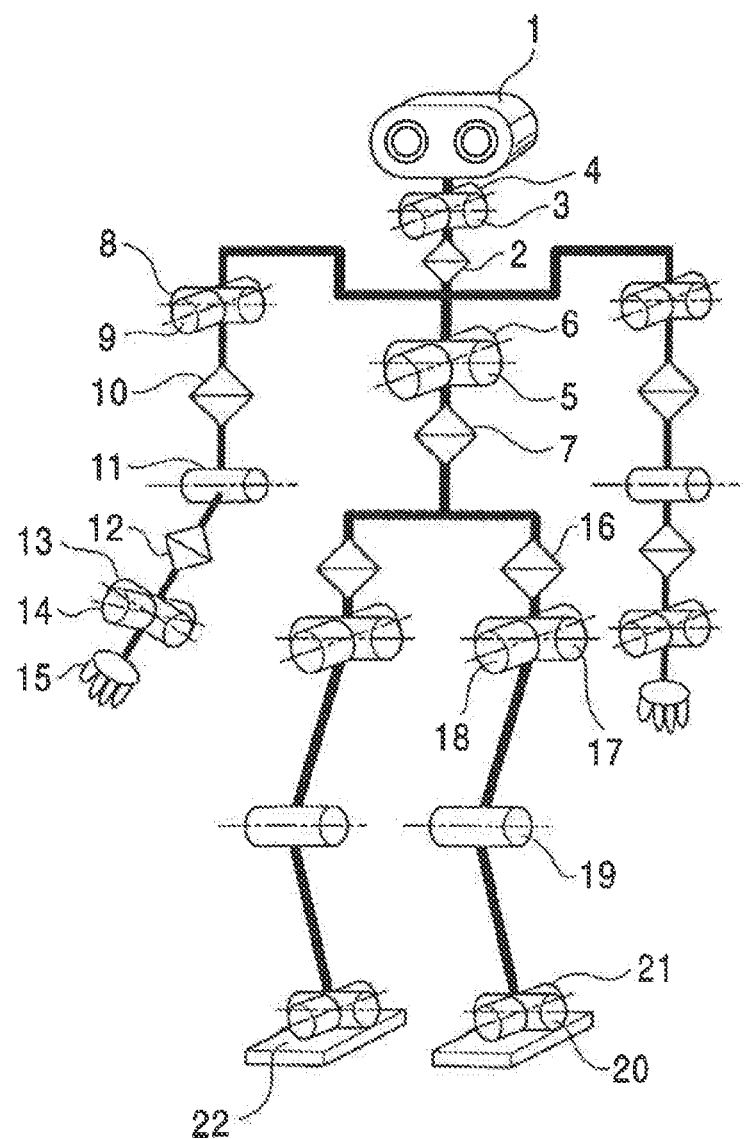
FIG. 3 is a schematic diagram illustrating degrees of freedom at respective points of articulation of a robot, in accordance with embodiments of the present invention.

FIG. 3 then illustrates the degrees of freedom available for each point of articulation.

Referring to these Figures, a neck joint for supporting the head 1 has 3 degrees of freedom: a neck-joint yaw-axis 2, a neck-joint pitch-axis 3, and a neck-joint roll-axis 4. Meanwhile each arm has 7 degrees of freedom; a shoulder-joint pitch-axis 8, a shoulder-joint roll-axis 9, an upper-arm yaw-axis 10, an elbow-joint pitch-axis 11, a forearm yaw-axis 12, a wrist-joint pitch-axis 13, a wrist-joint roll-axis 14, and a hand 15. Typically the hand 15 also has a multi-joints multi-degrees-of-freedom structure including a plurality of fingers. However, these are omitted for simplicity of explanation. The trunk has 3 degrees of freedom; a trunk pitch-axis 5, a trunk roll-axis 6, and a trunk yaw-axis 7. Each leg constituting the lower limbs has 6 degrees of freedom; a hip-joint yaw-axis 16, a hip-joint pitch-axis 17, a hip-joint roll-axis 18, a knee-joint pitch-axis 19, an ankle-joint pitch-axis 20, an ankle-joint roll-axis 21, and a foot 22. In the exemplary robot platform, the cross point between the hip-joint pitch-axis 17 and the hip-joint roll-axis 18 defines a hip-joint location of the legged walking robot 100 according to the embodiment. Again for simplicity it is assumed that the foot itself has no degrees of freedom, but of course this is non-limiting. As a result the exemplary robot 100 has 32 (=3+7×2+3+6×2) degrees of freedom in total. It will be appreciated however that this is merely exemplary, and other robot platforms may have more or fewer degrees of freedom.

Each degree of freedom of the exemplary legged locomotive robot platform 100 is implemented by using an actuator. For example, a small AC servo actuator that is directly coupled to a gear and that houses a one-chip servo-system may be used, although any suitable actuator may be considered, such as a linear servo, electroactive polymer muscle, pneumatic, piezoelectric, or the like.

It will be appreciated that any desired action that the robot platform is capable of may be implemented by control signals issued by a control system to one or more of the actuators of the robot (or to simulated actuators in a simulation, as applicable), to adjust the pose of the robot within its available degrees of freedom.

Figure 4:
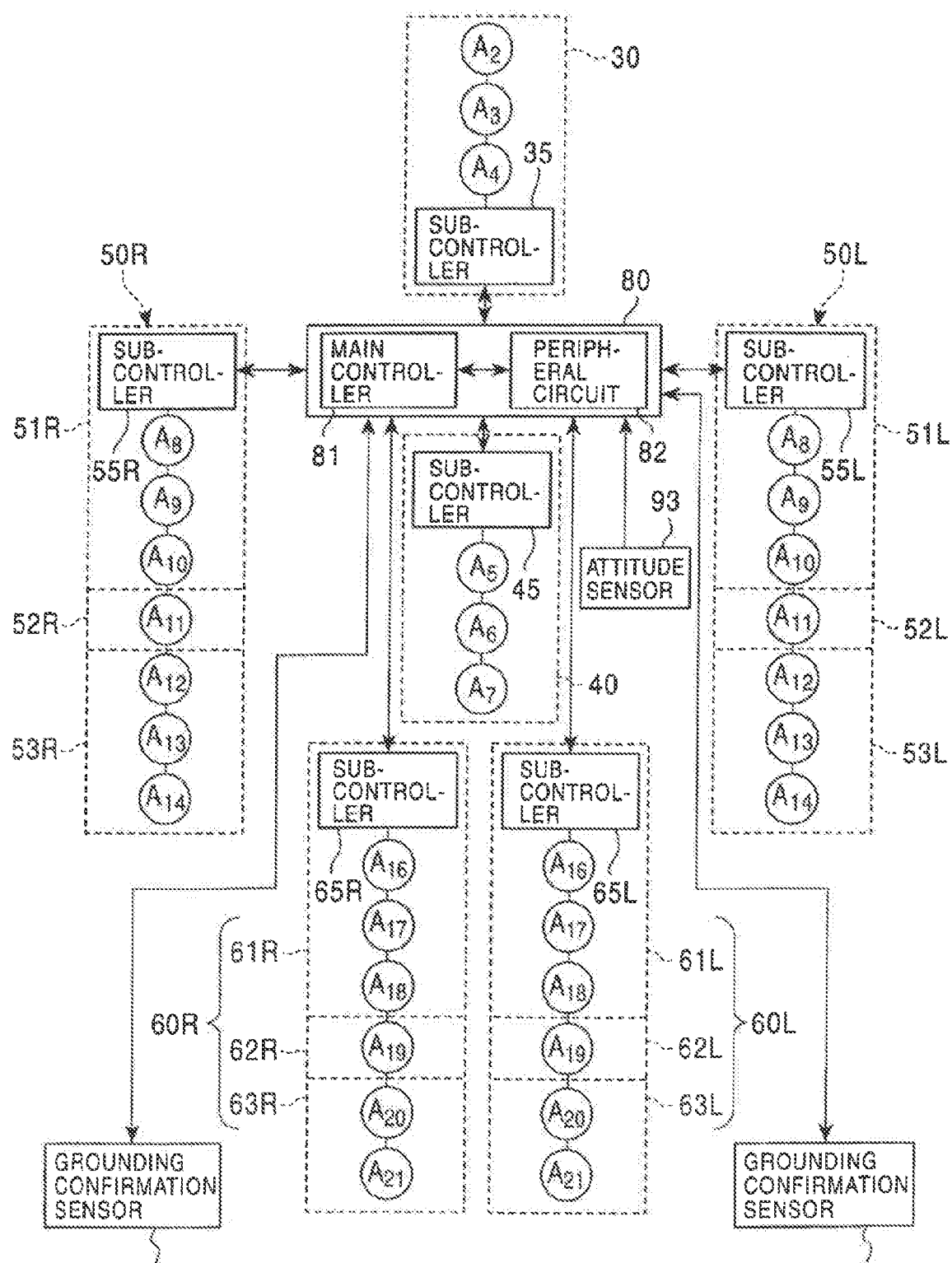
FIG. 4 is a schematic diagram of a control system for a robot, in accordance with embodiments of the present invention.

FIG. 4 schematically illustrates an exemplary control system for the robot platform 100.

A control unit 80 operates to co-ordinate the overall motion/actions of the robot. The control unit 80 has a main control unit 81 including main circuit components (not shown) such as a CPU (central processing unit) and a memory, and typically a peripheral circuit 82 including an interface (not shown) for sending and receiving data and/or commands to and from a power supply circuit (not shown) and each component of the robot. The control unit may comprise a communication interface and communication device for receiving data and/or commands by remote-controlling.

The control unit can be located anywhere suitable within the robot.

As shown in FIG. 4, the robot has logical units 30 (head), 40 (torso), and 50R/L and 60R/L each representing the corresponding one of four human limbs. The degrees-of-freedom of the robot 100 shown in FIG. 3 are implemented by the corresponding actuator within each unit. Hence the head unit 30 has a neck-joint yaw-axis actuator A2, a neck-joint pitch-axis actuator A3, and a neck-joint roll-axis actuator A4 disposed therein for representing the neck-joint yaw-axis 2, the neck-joint pitch-axis 3, and the neck-joint roll-axis 4, respectively. Meanwhile the trunk unit 40 has a trunk pitch-axis actuator A5, a trunk roll-axis actuator A6, and a trunk yaw-axis actuator A7 disposed therein for representing the trunk pitch-axis 5, the trunk roll-axis 6, and the trunk yaw-axis 7, respectively. Similarly the arm units 50R/L are broken down into upper-arm units 51R/L, elbow-joint units 52R/L, and forearm units 53R/L. Each of the arm units 50R/L has a shoulder-joint pitch-axis actuator A8, a shoulder-joint roll-axis actuator A9, an upper-arm yaw-axis actuator A10, an elbow-joint pitch-axis actuator A11, a-forearm yaw-axis actuator A12, a wrist-joint pitch-axis actuator A13, and a wrist-joint roll-axis actuator A14 disposed therein for representing the shoulder-joint pitch-axis 8, the shoulder-joint roll-axis 9, the upper-arm yaw-axis 10, the elbow-joint pitch-axis 11, an elbow-joint roll-axis 12, the wrist-joint pitch-axis 13, and the wrist-joint roll-axis 14, respectively. Finally the leg units 60R/L are broken down into thigh units 61R/L, knee units 62R/L, and second-thigh units 63R/L. Each of the leg units 60 R/L has a hip-joint yaw-axis actuator A16, a hip-joint pitch-axis actuator A17, a hip-joint roll-axis actuator A18, a knee-joint pitch-axis actuator A19, an ankle-joint pitch-axis actuator A20, and an ankle-joint roll-axis actuator A21 disposed therein for representing the hip-joint yaw-axis 16, the hip-joint pitch-axis 17, the hip-joint roll-axis 18, the knee-joint pitch-axis 19, the ankle-joint pitch-axis 20, and the ankle-joint roll-axis 21, respectively. Optionally the head unit 30, the trunk unit 40, the arm units 50, and the leg units 60 may have subcontrollers 35, 45, 55, and 65 for driving the corresponding actuators disposed therein.

Hence by issuing appropriate commands, the main controller (81) can control the driving of the joint actuators included in the robot 100 to implement the desired action. For example, the controller may implement a walking action by implementing successive phases, as follows:

(1) Single support phase (left leg) with the right leg off the walking surface;

(2) Double support phase with the right foot touching the walking surface;

(3) Single support phase (right leg) with the left leg off the walking surface; and (4) Double support phase with the left foot touching the walking surface.

Each phase in turn comprises the control of a plurality of actuators, both within the relevant leg and potentially elsewhere in the robot, for example moving the opposing arm and/or attitude of the torso to maintain the centre of gravity of the robot over the supporting foot or feet.

Optionally, to detect the manner and/or extent of a physical interaction with an object and/or the environment, physical sensors may be provided.

Hence in the exemplary robot, the feet 22 may each have one or more grounding detection sensors 91 (e.g. a proximity sensor or microswitch) for detecting the grounding of the feet 22 mounted on legs 60R and 60L respectively, and the torso is provided with an attitude sensor 93 (e.g. an acceleration sensor and/or a gyro-sensor) for measuring the trunk attitude. Outputs of the one or more grounding detection sensors 91 are used to determine whether each of the right and left legs is in a standing state or a swinging state during the walking action, whilst an output of the attitude sensor 93 is used to detect an inclination and an attitude of the trunk. Other sensors may also be provided, for example on a gripping component of the robot, to detect that an object is being held.

The robot may also be equipped with sensors to provide additional senses. Hence for example the robot may be equipped with one or more cameras, enabling the control unit (or a remote system to which sensor-based data is sent) to recognise a user of the robot, or a target object for retrieval. Similarly one or more microphones may be provided to enable voice control or interaction by a user. Any other suitable sensor may be provided, according to the robot's intended purpose. For example, a security robot intended to patrol a property may include heat and smoke sensors, and GPS.

Hence more generally, a robot platform may comprise any suitable form factor and comprise those degrees of freedom necessary to perform an intended task or tasks, achieved by the use of corresponding actuators that respond to control signals from a local or remote controller that in turn operates under suitable software instruction to generate a series of control signals corresponding to a performance of the intended task(s).

In order to provide software instruction to generate such control signals, a robot software development system may be provided for developing control sequences for desired actions, and/or for developing decision making logic to enable the robot control system to respond to user commands and/or environmental features.

As part of this development system, a virtual robot (i.e. a simulation) may be used in order to simplify the process of implementing test software (for example by avoiding the need to embed test software within robot hardware that may not have simple user-serviceable parts, or to simulate an environment or action where a mistake in the software could damage a real robot). The virtual robot may be characterised by the dimensions and degrees of freedom of the robot, etc., and an interpreter or API operable to respond to control signals to adjust the state of the virtual robot accordingly.

Control software and/or scripts to use with such software may then be developed using, and to use, any suitable techniques, including rule based/procedural methods, and/or machine learning/neural network based methods.

Figure 5:
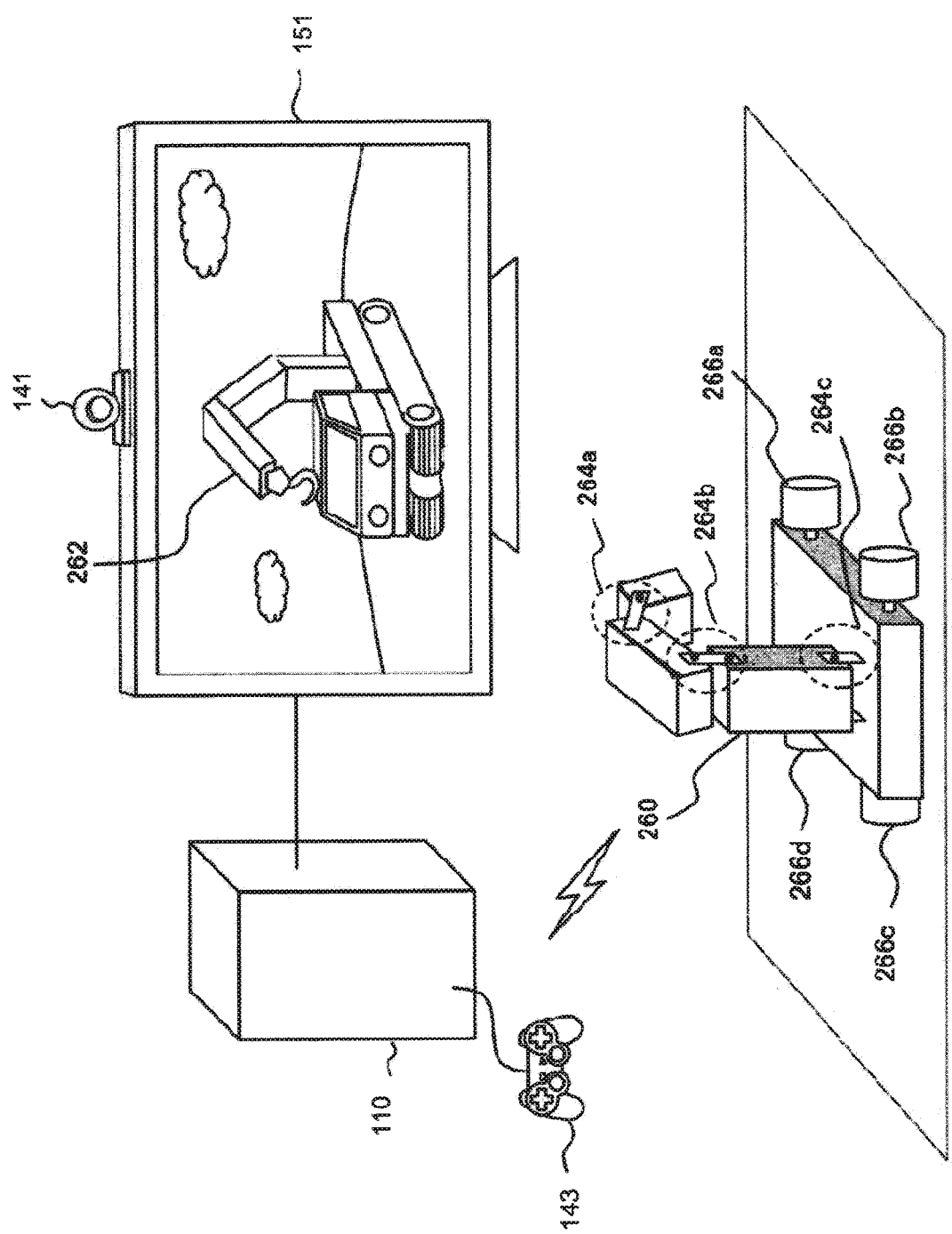
FIG. 5 is a schematic diagram of an interactive robot system in accordance with embodiments of the present invention.

Referring to FIG. 5, in an exemplary usage scenario a (toy) real robot crane 260 and a corresponding simulation (virtual robot crane 262) interact for entertainment purposes, for example mirroring each other's actions or behaving in a complementary manner, and/or using sensor data from the real or virtual robot to control actions of the other. The virtual robot may be graphically embellished compared to the real robot, for example having a face, or resembling an object or creature only approximated by the real robot.

In this example, the robot platform 260 has motorised wheels 266a-d and one articulated arm with actuators 264a-c. However it will be appreciated that any suitable form factor may be chosen, such as for example the humanoid robot 100 of FIG. 1, or a dog-shaped robot (not shown) or a spheroidal robot (not shown).

In FIG. 5, control of both the virtual and real robots is performed by a general purpose computer (110) operating under suitable software instructions, such as the Sony® PlayStation 4®. A user can interact with the PlayStation and hence optionally indirectly interact with one or both of the real and virtual robots using any suitable interface, such as a videogame controller 143. The PlayStation can detect the state of the real robot by receiving telemetry and other status data from the robot, and/or from analysis of an image of the real robot captured by a video camera 141. Alternatively or in addition the PlayStation can assume the state of the real robot based on expected outcomes of the commands sent to it. Hence for example, the PlayStation may analyse captured images of the real robot in expected final poses to determine its position and orientation, but assume the state of the robot during intermediate states such as transitions between poses.

In the example scenario, the user provides inputs to control the real robot via the PlayStation (for example indicating an amount and direction of travel with one joystick, and a vertical and horizontal position of the arm end with another joystick). These inputs are interpreted by the PlayStation into control signals for the robot. Meanwhile the virtual simulation of the robot may also be controlled in a corresponding or complementary manner using the simulation technique described above, according to the mode of play.

Alternatively or in addition, the user may directly control the real robot via its own interface or by direct manipulation, and the state of the robot may be detected by the PlayStation (e.g. via image analysis and/or telemetry data from the robot as described previously) and used to set a corresponding state of the virtual robot.

It will be appreciated that the virtual robot may not be displayed at all, but may merely act as a proxy for the real robot within a virtual environment. Hence for example the image of the real robot may be extracted from a captured video image and embedded within a generated virtual environment in an augmented reality application, and then actions of the real robot can be made to appear to have an effect in the virtual environment by virtue of those interactions occurring with a corresponding virtual robot in the environment mirroring the state of the real robot.

Alternatively, a virtual robot may not be used at all, and the PlayStation may simply provide control and/or state analysis for the real robot. Hence for example the PlayStation may monitor the robot via the camera, and cause it to pick up a ball or other target object placed within the camera's field of view by the user.

Hence more generally, a robot platform may interact with a general purpose computer such as the Sony® PlayStation 4 ® to obtain a series of control signals relating to setting a state of the robot, for the purposes of control by a user and/or control by the PlayStation to achieve a predetermined task or goal. Optionally the state, task or goal may be at least in part defined within or in response to a virtual environment, and may make use of a simulation of the robot.

In embodiments of the present invention, a robot platform such as the exemplary platforms 100 or 260 described previously herein may be used for the purposes of explanation, whilst it will be appreciated that any robot platform suited to the techniques and actions claimed herein below may be envisaged as being within the scope of the invention.

An alternating current (AC) signal carried along a conducting wire causes electric charges in the conducting wire to accelerate and decelerate with a frequency corresponding to the alternating current signal frequency, such that the conducting wire acts as an antenna that emits (radiates) a time varying electromagnetic signal. The frequency and amplitude of the electromagnetic waveform emitted by the conducting wire is determined by the frequency and amplitude of the alternating current signal carried by the conducting wire. For example, electrical power transmission is typically performed using an alternating current signal with a frequency in the range 50-60 Hertz (Hz) and a root-mean-square (RMS) voltage of about 230 V. A conducting wire carrying an alternating current signal will emit a time varying electromagnetic signal comprising an electric field component and a magnetic field component, for which the electric field arises due to the charges in accordance with Gauss's law, and the magnetic field arises due to the movement of charges with respect to time (i.e. currents).

Figure 6:
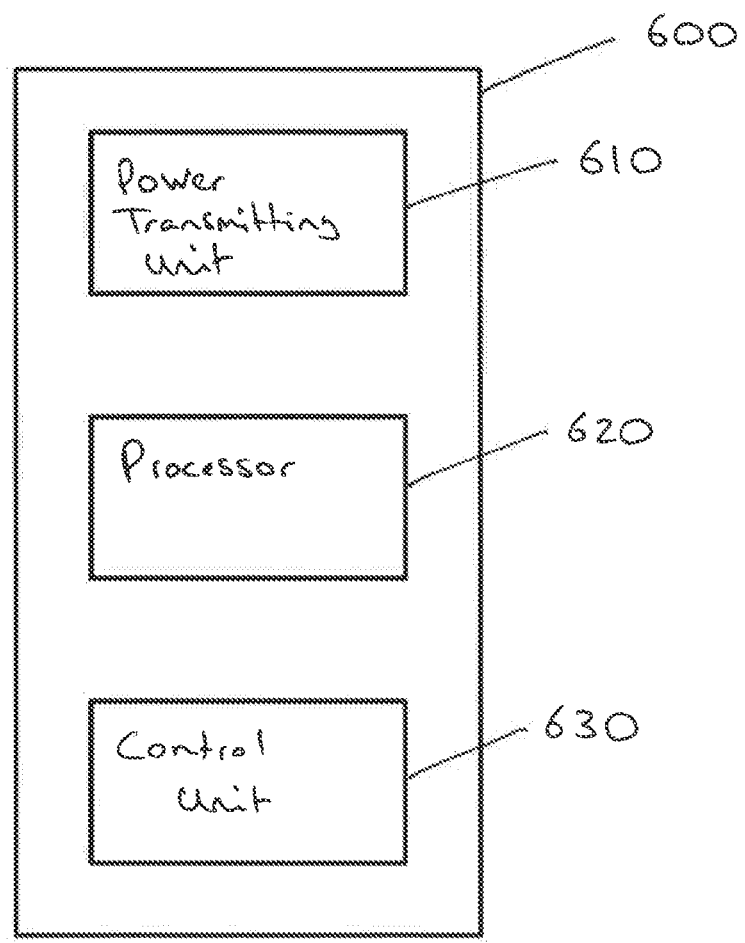
FIG. 6 is a schematic diagram illustrating a configuration of a charging apparatus for wireless charging of one or more robotic devices in accordance with embodiments of the invention.

Hence a wire carrying an alternating current signal will emit a time varying electromagnetic signal having magnetic field lines represented by concentric circles (determined by Ampere's law) around the current carrying wire. The magnitude of the magnetic field is dependent on the amplitude of the current signal carried by the wire and the strength of the magnetic field decreases with radial distance from the wire. An oscillating magnetic field can thus be emitted by the conducting wire in the form of lines of magnetic flux. The changes in magnetic flux (time-varying magnetic flux) generated by the conducting wire can propagate through space and exert a force on an electrical charge thereby causing motion of the electrical charge, which can give rise to an electromotive force and current flow in an external circuit. As such, an alternating current carrying wire may be used to induce a current in an external circuit by positioning the external circuit within the time varying magnetic flux of the oscillating magnetic field. In this way, the alternating current signal can be supplied to the conducting wire comprising inductive elements in order to generate a time-dependent magnetic flux that induces an electromotive force (EMF) in an external circuit, thereby achieving wireless transmission of power to the external circuit. Inductive elements may include, for example, coils or inductors. Referring now to FIG. 6, in embodiments of the disclosure a charging apparatus 600 for wireless charging of one or more robotic devices 100, 260 comprises a power transmitting unit 610 comprising a plurality of conducting wires each configured to carry a respective alternating current signal and to generate lines of magnetic flux when the conducting wire carries the alternating current signal, a processor 620 configured to detect a presence or an absence of an induction coil of a robotic device 100, 260 within a predetermined distance of a conducting wire and to generate control data based on the result of the detection, and a control unit 630 configured to control at least one of an amplitude and a frequency of each respective alternating current signal supplied to each of the conducting wires based on the control data, wherein the control unit 630 is configured to increase at least one of an amplitude and a frequency of an alternating current signal supplied to a conducting wire in response to control data indicating the presence of the induction coil within the predetermined distance of the conducting wire. It will be appreciated that the robotic device may operate in a similar manner to the exemplary robot platforms 100 or 260, to any applicable extent appropriate to the techniques and actions claimed herein below.

In embodiments of the disclosure the power transmitting unit 610 comprises a plurality of conducting wires that can each carry a respective alternating current signal. The conducting wires may be formed of any suitable material typically used for distributing electrical power to homes, offices or other premises, such as copper or aluminium metal and suitably insulated. In some examples, the plurality of conducting wires of the transmitting unit may be provided within a flooring, such as on the underside of a carpet tile, and the robotic device 100, 260 can be controlled to maneuver the robotic device 100, 260 over the upper side of the carpet tile. Each of the plurality of conducting wires is electrically connected to the control unit 630 or another component of the charging apparatus 600 that is controlled by the control unit 630. The amplitude and/or frequency of the alternating current signal supplied to, and thus carried by, each conducting wire can be controlled by the control unit 630. A respective alternating current signal can be supplied to each of the plurality of conducting wires such that a first conducting wire may carry a first alternating current signal with a first signal amplitude and a first signal frequency, and a second conducting wire may carry a second alternating current signal with a second signal amplitude and a second signal frequency, wherein the properties of the respective signals are controlled by the control unit 630. Mains electricity received by the charging apparatus 600 may have an alternating current signal with a frequency of 50-60 Hz. The control unit 630 comprises one or more signal processing units that can process the mains alternating current signal and generate an alternating current signal with a frequency of the order of kHz suitable for inductive charging purposes.

By increasing (or decreasing) an amplitude of the alternating current signal supplied to a conducting wire, the strength of the magnetic field, and thus the magnetic flux (Wb), generated by the conducting wire can be increased (or decreased) and the magnitude of the electromotive force induced in a nearby external circuit (such as the induction coil of the robotic device 100, 260) can be increased (or decreased). Alternatively or in addition, the frequency of the alternating current signal supplied to the conducting wire can be increased (or decreased), which increases (or decreases) the rate of change of the magnetic field (i.e. adjusts the frequency of the time-varying magnetic field) and the magnetic flux (Wb) generated by the conducting wire, thereby increasing (or decreasing) the magnitude of the electromotive force induced in the external circuit positioned proximate to the conducting wire. Therefore, a time-varying magnetic field with adjustable amplitude and/or frequency can be generated by any wire of the plurality of conducting wires in accordance with the amplitude and/or frequency of the alternating current signal supplied to a conducting wire under the control of the control unit 630. The control unit 630 thus allows the properties of the magnetic field generated by each conducting wire to be controlled.

The respective conducting wires of the power transmitting unit 610 can be spatially separated with respect to each other. For example, a first conducting wire may extend from a point A to a point B across a first region, whereas a second conducting wire may extend from a point C to a point D across a second region. By controlling the alternating current signal that is supplied to each conducting wire, the properties of the time varying magnetic field generated by the respective wires can be controlled and thus the properties of the time varying magnetic field generated at the respective portions of the power transmitting unit 610 can be controlled. For example, the magnitude and/or the frequency of the AC signal supplied to the first wire may be increased from an initial value, whereas the magnitude and/or the frequency of the AC signal supplied to the second wire may be decreased from an initial value. In this way, the magnetic flux generated by the first conducting wire extending across the first region can be controlled to be greater than the magnetic flux generated by the second conducting wire extending across the second region.

In embodiments of the disclosure the processor 620 can be configured to detect the presence or the absence of the induction coil of the robotic device 100, 260 within a predetermined distance of a conducting wire and to generate control data based on the result of the detection. The processor 620 may comprise a central processing unit (CPU) and a memory. The processor 620 can be configured to periodically receive data indicating the properties (e.g. changes in amplitude and/or frequency) of the respective alternating current signals carried by the respective conducting wires. The processor 620 can thus be configured to periodically analyse the properties of each alternating current signal carried by each conducting wire in order to detect the presence or the absence of an induction coil of the robotic device 100, 260 within the predetermined distance of the conducting wire. In other words, the processor 620 can receive data indicating the properties of the respective alternating current signals carried by the respective conducting wires and can detect whether or not an induction coil of an external electronic device is within the predetermined distance of a conducting wire of the plurality of conducting wires by analysing one or more signal properties to detect changes indicative of induction occurring (optionally induction above a threshold amount, corresponding to the predetermined distance).

It will be appreciated that the robotic device 100, 260 may comprise a plurality of induction coils and that the processor 620 can be configured to detect the presence of the plurality of induction coils within a predetermined distance of a conducting wire of the power transmitting unit 610. Alternatively or in addition, a first robotic device 100, 260 may comprise one or more induction coils and a second robotic device 100, 260 may also comprise one or more induction coils. The processor 620 can be configured to detect the presence of the plurality of induction coils within the predetermined distance of one or more respective conducting wires when a first induction coil corresponds to the first robotic device and a second induction coil corresponds to a second robotic device. For simplicity the following explanation will refer to detecting the presence or the absence of one induction coil of the robotic device 100, 260, but it will be appreciated that these techniques allow for the presence of a plurality of induction coils, which are simultaneously within the predetermined distance of one or more conducting wires, to be detected.

In embodiments of the disclosure the control unit 630 can be configured to control at least one of an amplitude and a frequency of each respective alternating current signal supplied to each of the conducting wires based on the control data, wherein the control unit 630 is configured to increase at least one of an amplitude and a frequency of an alternating current signal supplied to a conducting wire in response to control data indicating the presence of the induction coil within the predetermined distance of the conducting wire. The control unit 630 may comprise a central processing unit (CPU) and a memory, and can control the respective signals supplied to the respective conducting wires based on the control data generated by the processor 620. The charging apparatus 600 can be electrically connected to the mains power supply via a power outlet and can thus receive a mains power alternating current signal with a frequency of 50-60 Hz. The control unit 630 can be configured to process the alternating current signal received from the mains power supply in order to adjust at least one of the amplitude and the frequency of the alternating current signal. This means that the control unit 630 can receive control data from the processor and generate a plurality of respective alternating current signals which can be supplied to each of the plurality of conducting wires. In this way, alternating current signals with frequencies of the order of kHz (e.g. 50-400 kHz) can be generated by the control unit 630 and supplied to the respective conducting wires of the power transmitting unit 610. The frequency of the respective alternating current signal supplied to the respective conducting wires can thus be controlled by the control unit 630 and the frequency of a signal supplied to a conducting wire can be increased when the conducting wire is within the predetermined distance of the induction coil.

In some examples, the control unit 630 may comprise one or more rectifiers and one or more inverters. The control unit 630 can be configured to convert the mains alternating current to a direct current signal and generate an alternating current signal at the desired frequency using the direct current signal. As such, the one or more signal processing channels of the control unit 630 may each comprise circuitry comprising a rectifier and an inverter, in this way the mains alternating current signal can be rectified to generate a direct current signal and then inverted to generate an alternating current signal from the direct current signal, and the respective signals processed by the respective signal processing channels can be supplied to the respective conducting wires.

For example, for a charging apparatus 600 comprising N respective conducting wires, the control unit 630 comprises N respective signal processing channels. The charging apparatus 600 can receive the mains alternating current signal and pass the signal to each of the N respective signal processing channels of the control unit 630. The control unit 630 can process the N respective alternating current signals based on the control data generated by the processor 620, and can thus generate N respective alternating current signals, which can be supplied to the N respective conducting wires. The alternating current signals supplied to the respective conducting wires can thus be controlled by the control unit 630 in response to detecting the presence or the absence of one or more induction coils within the predetermined distance of any of the conducting wires. In this way, the control unit 630 can control at least one of an amplitude and a frequency of the alternating current signal carried by each respective wire of the power transmitting unit 610.

Figure 7A:
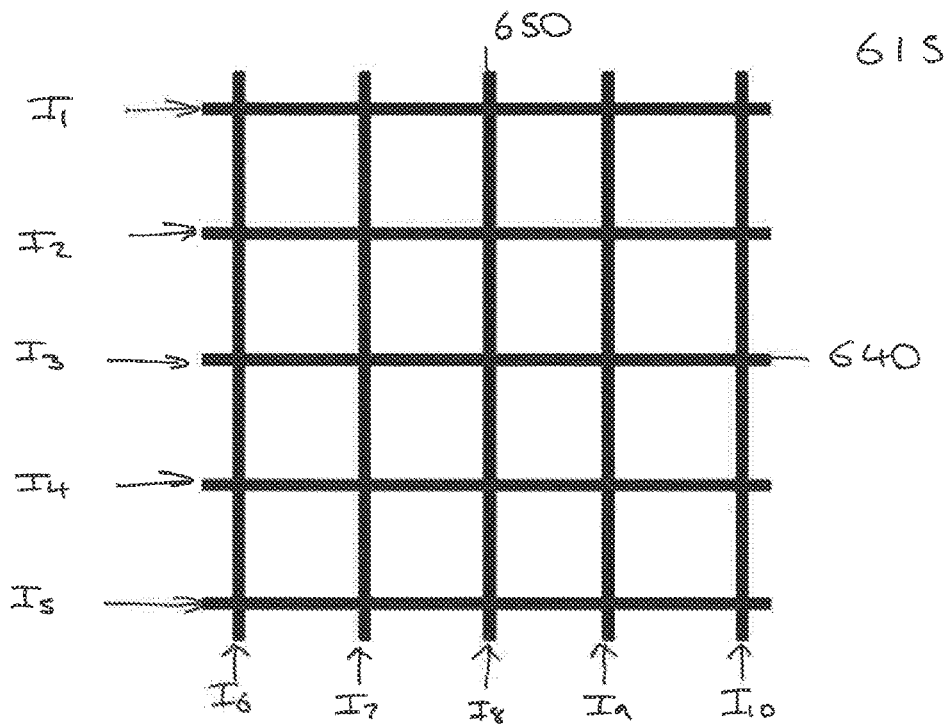
FIGS. 7A and 7B are schematic diagrams illustrating alternative configurations of a plurality of conducting wires, in accordance with embodiments of the present invention.
Figure 7B:
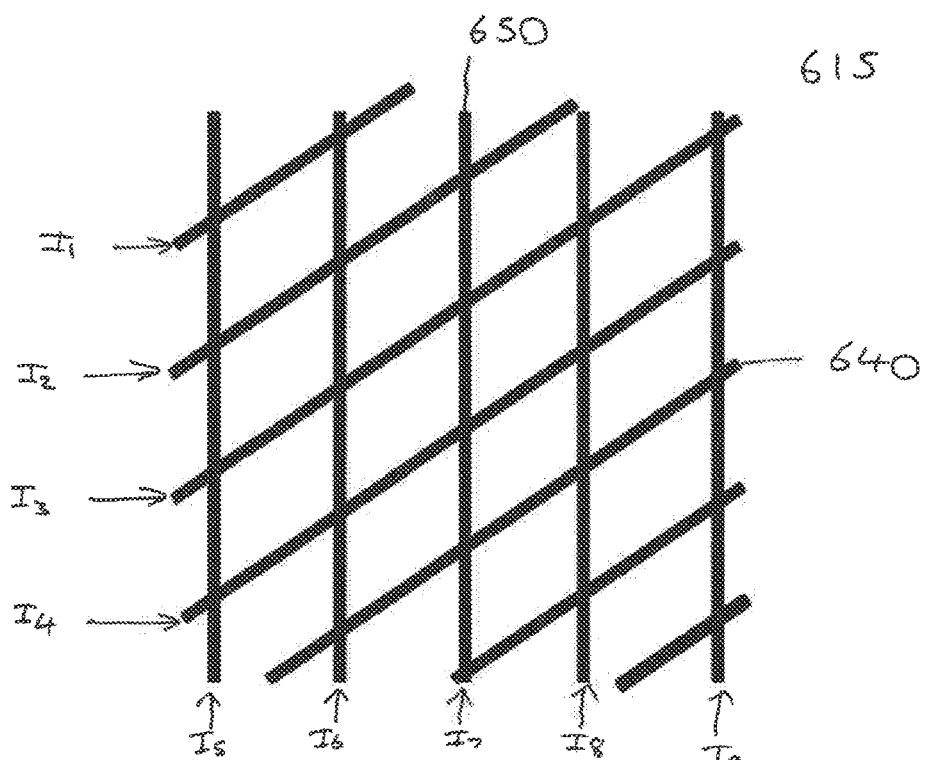

In embodiments of the disclosure, the plurality of conducting wires comprises one or more conducting wires extending in a first direction and one or more conducting wires extending in a second direction, the first direction and the second direction defining a plane on which the conducting wires are arranged. FIGS. 7A and 7B schematically illustrate alternative configurations of the plurality of conducting wires 615 of the power transmitting unit 610. FIG. 7A illustrates the plurality of conducting wires 615 where one or more of the conducting wires 640 extend in the first direction and one or more of the conducting wires 650 extend in the second direction, wherein in the example shown the first direction and the second direction are substantially orthogonal with respect to each other. FIG. 7B illustrates the plurality of conducting wires 615 where one or more of the conducting wires 640 extend in the first direction and one or more of the conducting wires 650 extend in the second direction, wherein in the example shown the first direction and the second direction are arranged at an angle with respect to each other such that the first direction and the second direction are not orthogonal to each other.

The plurality of conducting wires 615 are arranged so that at least one conducting wire 640 extends in the first direction and at least one conducting wire 650 extends in the second direction. The first direction and the second direction can form a two-dimensional plane as illustrated, such that the plurality of conducting wires 615 of the power transmitting unit 610 extend in the first direction and the second direction on substantially the same two-dimensional plane defined by the first direction and the second direction.

As discussed previously, the control unit 630 can be configured to control at least one of an amplitude and a frequency of each alternating current signal ($I_1, I_2, I_3 \ldots I_{10}$) supplied to each of the conducting wires of the plurality of wires 615 based on the control data generated by the processor 620. The respective alternating current signals that can be supplied to each of the conducting wires are illustrated in FIGS. 7A and 7B, where the amplitude and/or frequency of each of the signals ($I_1, I_2, I_3 \ldots I_{10}$) can be controlled by the control unit 630. As such, the control unit 630 can be configured to control the alternating current signals supplied to each conducting wire of the plurality of conducting wires 615 where each of the alternating current signals ($I_1, I_2, I_3 \ldots I_{10}$) may be processed by a respective signal processing channel of the control unit 630.

For example, the first signal $I_1$ may be processed by a first signal processing channel of the control unit 630 and a second signal $I_2$ may be processed by a second signal processing channel of the control unit 630. The output of the first signal processing channel may be supplied to a first conducting wire and the output of the second signal processing channel may be supplied to a second conducting wire. In this way, the properties of the magnetic field and the magnetic flux generated by the first conducting wire carrying the first alternating current signal $I_1$ can be controlled by controlling at least one of the amplitude and the frequency of the alternating current signal $I_1$ supplied to the conducting wire. Therefore, the magnetic flux generated by the first conducting wire extending across a first region can be controlled by the controlling unit 630.

Similarly, the magnetic flux generated by any of the plurality of conducting wires can be controlled by controlling the properties of any of the signals ($I_1, I_2, I_3 \ldots I_{10}$) supplied to the respective conducting wires 615. This means that the charging apparatus 600 can be configured to generate the lines of magnetic flux in accordance with control implemented by the control unit 630 in a manner such that the magnitude of the flux generated by the power transmitting unit 610 may be different for a first region of the power transmitting unit 610 subtended by a first conducting wire than a second region of the power transmitting unit 610 subtended by a second conducting wire.

In embodiments of the disclosure, the plurality of conducting wires comprises at least a first and a third conducting wire extending in the first direction and a second and a fourth conducting wire extending in the second direction, the first conducting wire and the third conducting wire being separated by a first predetermined distance and the second conducting wire and the fourth conducting wire being separated by a second predetermined distance, the first predetermined distance being greater than or equal to the second predetermined distance in a manner such that the plurality of wires define a grid.

Figure 8:
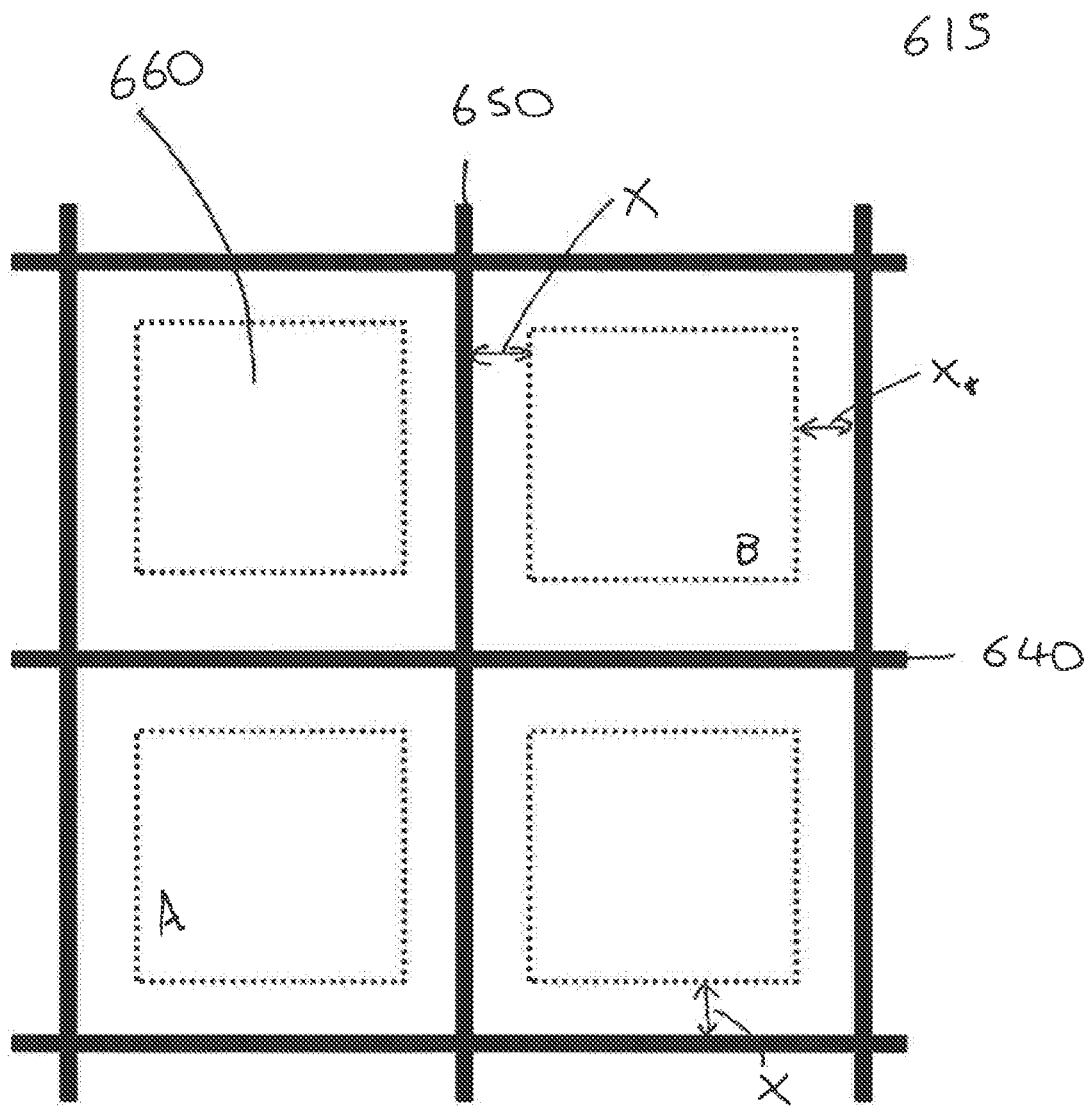
FIG. 8 is a schematic diagram illustrating detecting the presence or the absence of an induction coil within a predetermined distance of a conducting wire, in accordance with embodiments of the present invention.

In embodiments of the disclosure, the processor 620 is configured to detect the presence or the absence of the induction coil of the robotic device 100, 260 within the predetermined distance of the conducting wire based on an analysis of the alternating current signal carried by the conducting wire. FIG. 8 is a diagram schematically illustrating detecting the presence or the absence of the induction coil of the robotic device within the predetermined distance of a conducting wire. A horizontal distance X on the two-dimensional plane defined by the first direction and the second direction is shown, and the techniques discussed assume that the robotic device 100, 260 is maneuverable in the two-dimensional plane defined by the first direction and the second direction, but the vertical distance Z (in the direction out of the page) between the induction coil of the robotic device 100, 260 and the plurality of wires does not vary as the robotic device is maneuvered (for example, the vertical distance from the induction coil to the two dimensional plane may be anywhere within the range of 0.5-40 cm). For example, the conducting wires 615 may be arranged in the two-dimensional plane and the robotic device 100, 260 may move from position A to position B, as shown in FIG. 8 by driving one or more actuators. Therefore, in the following techniques, when the induction coil of the robotic device 100, 260 is moved to within the predetermined distance of the conducting wire, this is due to movement of the robotic device in the two-dimensional plane defined by the first direction and the second direction whilst the vertical distance Z between the induction coil and the two-dimensional plane remains unchanged. Therefore, assuming that the vertical height Z of the indication coil with respect to the two-dimensional plane remains unchanged, references to the term predetermined distance refer to the distance X illustrated in FIG. 8. It will be appreciated that the distance of the induction coil from a conducting wire may be calculated using standard trigonometric calculations (distance$^2$=X$^2$+Z$^2$).

By analysing the properties of the alternating current signal carried by the conducting wires 640, 650, the presence of the induction coil of the robotic device 100, 260 within the horizontal distance X of the conducting wire 640, 650 may be detected. When the induction coil of the robot is moved from a position within the region 660 to a position within the distance X from the conducting wire 640, 650, an analysis of the alternating current signal carried by each conducting wire 640, 650 can be used to identify the presence of the induction coil within the distance X of that conducting wire 640, 650. When the induction coil of the robotic device 100, 260 is moved to be proximate to the conducting wire, the magnetic flux generated due to the alternating current carried by the conducting wire will induce an electromotive force in the induction coil, and this coupling between the conducting wire and the induction coil can alter (perturb) the electrical characteristics of the conducting wire when proximate to the induction coil. In some examples, the alteration (perturbation) of the electrical characteristics of the conducting wire, when the induction coil is moved to within the predetermined distance X, can cause a change in one or more properties of the alternating current signal carried by the conducting wire (e.g. signal amplitude, frequency and/or phase) which can be analysed by the processor 620 to detect the presence or the absence of the induction coil within the predetermined distance.

For example, a first alternating current signal with a first amplitude and a first frequency may be supplied to a first conducting wire 640, 650 under the control of the control unit 630. When the induction coil is moved to a position within the predetermined distance X of the first conducting wire, the electromotive force induced in the induction coil causes a current to flow in the induction coil, and a property of the first alternating current signal (such as the amplitude, frequency and/or phase) may change in response to the coupling between the first conducting wire and the induction coil. In other words, the electrical characteristics of the conducting wire may be different when the induction coil is proximate to the conducting wire and harvesting power from the conducting wire to when the induction coil is not proximate to the conducting wire. The change in the electrical characteristics can yield a change in the alternating current signal carried by the conducting wire which can be detected in order to detect the presence or the absence of the induction coil within the predetermined distance. Therefore, the presence or the absence of the induction coil within the predetermined distance X of the first conducting wire 640, 650 may be detected by analysing the alternating current signal carried by the conducting wire 640, 650 to identify one or more changes. In some examples, changes in the voltage appearing across a conducting wire and/or a change in current flow may be indicative of the presence or the absence of the induction coil within the predetermined distance X of the conducting wire. An electromotive force can be induced in the induction coil by the power transmitting unit 610 which causes electrons to flow in the induction coil and thus the circuitry of the robotic device 100, 260.

Alternatively or in addition, the robotic device 100, 260 may be configured to periodically modify its inductive load, using one or more switches (or an array of switches), which can cause a periodic variation in the electromotive force, and thus the current, induced in the induction coil of the robotic device 100, 260. In this way, the processor can analyse the respective alternating current signals carried by the conducting wires 640, 650 and detect a periodic variation in an alternating current signal that is characteristic of the periodic modification of the load of the induction coil of the robotic device (i.e. detect a time-dependent property of a signal that is characteristic of the robotic device 100, 260). As such, the presence of the induction coil of the robotic device within the predetermined distance X can be detected based on whether or not a periodic variation of the alternating current signal carried by a conducting wire is detected which corresponds to the periodic modification of the load of the induction coil, the periodic variation serving to signify the presence of the robotic device 100, 260.

In embodiments of the disclosure, each conducting wire 640, 650 comprises one or more primary coils each configured to generate the time-varying magnetic flux when the conducting wire carries the alternating current signal. The one or more primary coils can be positioned at one or more respective portions of each conducting wire 640. 650. When the conducting wire 640, 650 carries the alternating current signal, the time-varying magnetic flux can thus be generated by the one or more primary coils positioned at the one or more respective portions of the conducting wire 640, 650. Hence the strength of the magnetic field and the magnitude of the variations in the time-varying magnetic flux generated by the conducting wire can be greater at the portion of the conducting wire where a primary coil is positioned than a portion of the conducting wire where no primary coil is positioned. Therefore the alternating current carried by the conducting wire can result in a time-varying magnetic flux being generated by the one or more primary coils, and when the induction coil of the robotic device 100, 260 is within a predetermined distance of the primary coil the time-varying magnetic flux can induce an electromotive force in the induction coil.

By providing a primary coil at a portion of a conducting wire 640, 650, it is possible to generate, for a given alternating current signal carried by the conducting wire 640, 650, a greater magnetic flux at a localised region proximate to the primary coil. The position of the localised region of concentrated magnetic flux corresponds to the position of the portion of the conducting wire comprising the primary coil. As such, the primary coil can generate the time-varying magnetic flux when the conducting wire carries the alternating current signal. When the induction coil of the robotic device 100, 260 is within a predetermined distance of the primary coil, the time-varying magnetic flux generated by the primary coil will induce a greater electromotive force in the induction coil in comparison to when the induction coil is within the predetermined distance of a portion of the conducting wire having no primary coil. This means that the power transmitted from the power transmitting device to the induction coil of the robotic device is greatest when the induction coil is within a predetermined distance of a primary coil. Consequently, the primary coil can be used to wirelessly transmit power to the induction coil when an alternating current signal is supplied to the conducting wire comprising the primary coil.

Alternatively or in addition, the electrical properties (such as capacitance, resistance and/or inductance) of the primary coil and the induction coil of the robotic device may be selected so that a stronger coupling is achieved between the primary coil and the induction coil. Hence power can be transmitted from the primary coil to the induction coil over greater separation distances between the respective coils based on resonant inductive coupling thereby achieving resonant power transmission between the charging apparatus 600 and the robotic device 100, 260.

Figure 9:
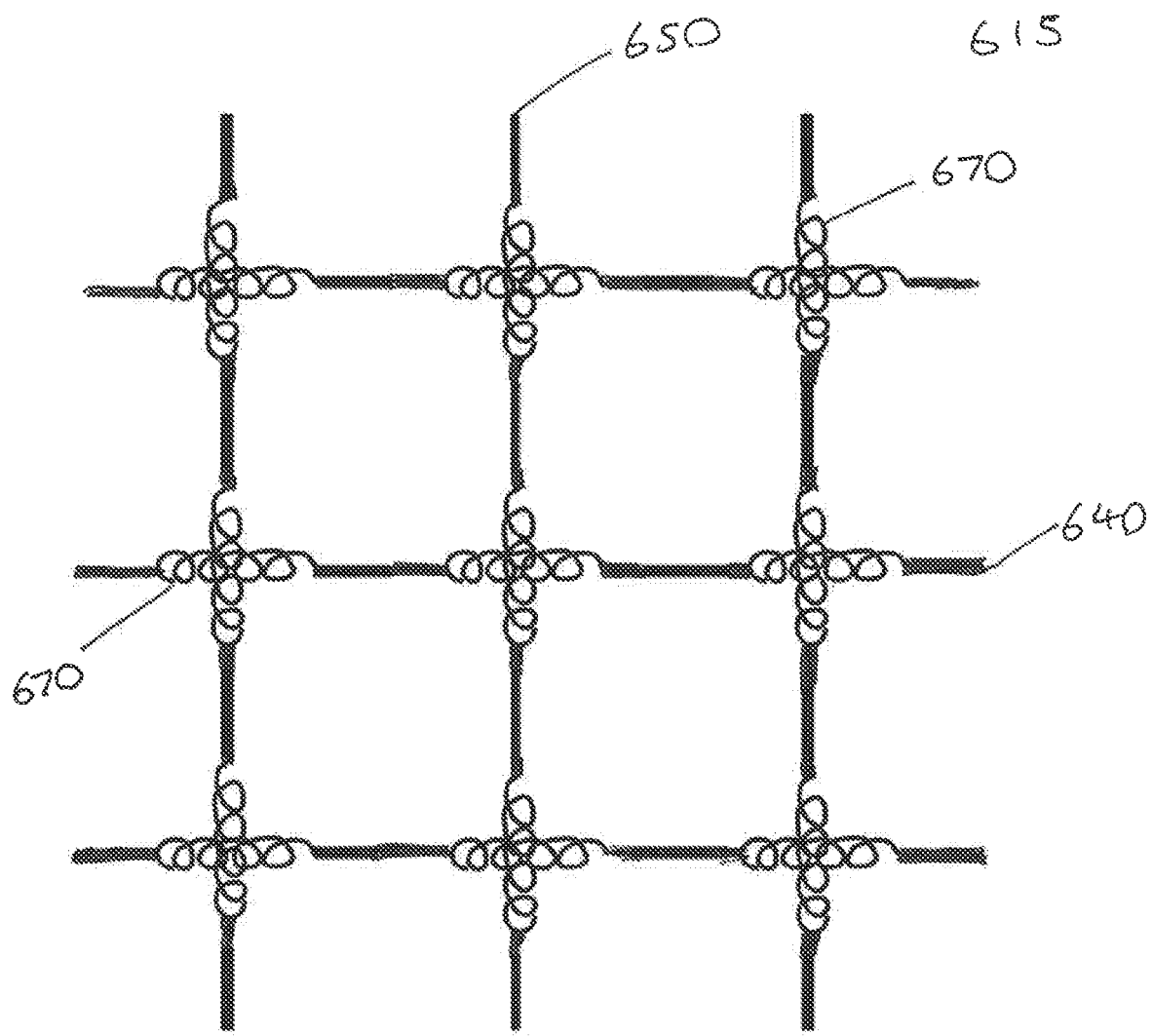
FIG. 9 schematically illustrates a plurality of conducting wires 615 each comprising one or more primary coils in accordance with embodiments of the present invention.

In embodiments of the disclosure, for each conducting wire the one or more primary coils are disposed at one or more portions of the conducting wire that are proximate to another conducting wire of the plurality of conducting wires. FIG. 9 schematically illustrates a plurality of conducting wires 615, where each conducting wire 640, 650 comprises one or more primary coils 670 disposed at one or more portions of each conducting wire 640, 650 that are proximate to another conducting wire 640, 650. The plurality of conducting wires 615 can be arranged so that each conducting wire 640, 650 comprises at least one primary coil at a portion of the conducting wire 640, 650 that crosses another conducting wire 640, 650 of the plurality of conducting wires 615. In other words, for a first conducting wire 640 extending in a first direction and a second conducting wire 650 extending in a second direction, a first primary coil 670 can be disposed at the portion of the first conducting wire 640 that crosses the second conducting wire 650, and a second primary coil 670 can be disposed at the portion of the second conducting wire 650 that crosses the first conducting wire 640. This means that one or more primary coils 670 can be disposed at the positions where the respective conducting wires cross each other on the two-dimensional plane defined by the first direction and the second direction.

Figure 10:
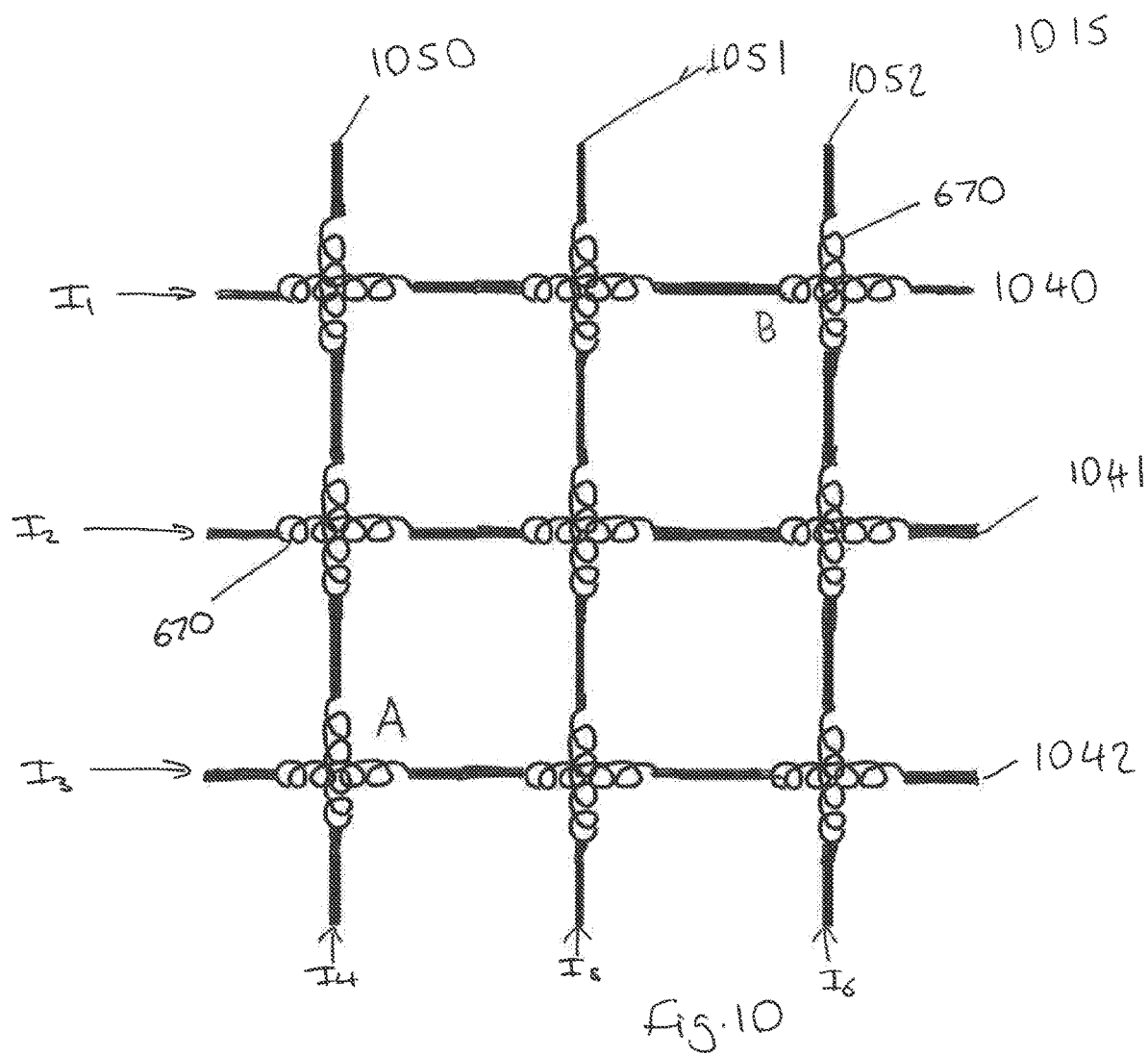
FIG. 10 schematically illustrates an example of controlling alternating current signals supplied to conducting wires, in accordance with embodiments of the present invention.

In embodiments of the disclosure, the control unit 630 is configured to increase at least one of an amplitude and a frequency of an alternating current signal supplied to a first conducting wire in response to control data indicating the presence of the induction coil 670 within the predetermined distance of the first conducting wire and to decrease at least one of an amplitude and a frequency of an alternating current signal supplied to a second conducting wire in response to control data indicating the absence of the induction coil 670 within the predetermined distance of the second conducting wire. FIG. 10 schematically illustrates an example of controlling alternating current signals supplied to conducting wires in response to the presence or absence of an induction coil of a robotic device within a predetermined distance of a conducting wire. It will be appreciated that this illustration serves to provide an example and a greater number of respective conducting wires may be used.

The plurality of conducting wires 1015 comprises a first 1040, second 1041 and third 1042 conducting wire extending in the first direction and a fourth 1050, fifth 1051 and sixth 1052 conducting wire extending in the second direction, wherein each conducting wire is configured to carry a respective alternating current signal ($I_1$, $I_2$ . . . $I_6$). Each conducting wire comprises one or more primary coils 670 disposed at one or more portions of each conducting wire that are proximate to another conducting wire. The position A as shown in FIG. 10 represents the position of an induction coil of a robotic device within the predetermined distance of the third conducting wire 1042 and the fourth conducting wire 1050. As discussed previously, the presence of the induction coil 670 within the predetermined distance of a conducting wire can be detected based on an analysis of the properties of the alternating current signal carried by each conducting wire. When the processor 620 detects the presence of the induction coil within the predetermined distance of the third conducting wire 1042 and the fourth conducting wire 1050, the processor 620 can generate control data indicating the presence of the induction coil within the predetermined distance of the two conducting wires. In response to the control data generated by the processor 620, the control unit 630 can increase at least one of an amplitude and a frequency of the alternating current signal supplied to the third conducting wire 1042 and the fourth conducting wire 1050 and the control unit 630 can decrease at least one of an amplitude and a frequency of the alternating current signal supplied to the first 1040, the second 1041, the fifth 1051 and the sixth 1052 conducting wires.

By increasing at least one of an amplitude and a frequency of the alternating current signal supplied to a conducting wire within the predetermined distance of the induction coil, the magnitude of the variations in the time-varying magnetic flux generated by the conducting wire that is proximate to the induction coil can be increased, and as such the magnitude of the electromotive force induced in the induction coil can be increased. The control unit 630 can adjust the respective alternating current signals supplied to the respective conducting wires in response to the control data in order to increase the power transmitted by a conducting wire when the induction coil is close to the conducting wire. In addition, the control unit 630 can decrease the amplitude and/or frequency of the alternating current signal supplied to conducting wires that are not proximate to the induction coil and the energy required to power the plurality of conducting wires can be reduced, so as to avoid wasteful powering of the entire array of conducting wires.

In embodiments of the disclosure, the processor 620 is configured to generate the control data indicating the presence of the induction coil within the predetermined distance of the conducting wire in response to detecting the presence of the induction coil within the predetermined distance of the conducting wire for a period of time exceeding a predetermined time threshold. As discussed previously, the processor 620 can be configured to periodically analyse the properties of the respective alternating current signals carried by the each conducting wire and can detect the presence or the absence of the induction coil with respect to each conducting wire based on an analysis of the signals.

In a first mode the processor 620 can be configured to periodically generate control data comprising a binary indication for each conducting wire indicating whether or not the induction coil is within the predetermined distance of the conducting wire and a timestamp can be associated with each binary indication. Alternatively, in a second mode in response to detecting the presence of the induction coil within the predetermined distance of the conducting wire, the processor 620 can be configured to require a plurality of respective positive detections for the same conducting wire indicating the presence of the induction coil within the predetermined distance of that conducting wire for a period of time exceeding a predetermined time threshold prior to generating the control data. In this way, the processor 620 can be configured to generate the control data when the induction coil remains proximate to a conducting wire for at least a certain period of time (such as when the robotic device is stationary).

When operating in the second mode, the control unit 630 can be configured, in response to the control data, to supply an alternating current signal to the conducting wire(s) within the predetermined distance of the induction coil with a maximum signal amplitude for the alternating current signal. In this way, when the robotic device is stationary, an alternating current signal with a maximum signal amplitude can be supplied to a conducting wire that is within the predetermined distance of the induction coil thereby allowing the magnitude of the induced electromotive force to be increased. In addition, when operating in the second mode, the control unit 630 may stop supplying alternating current signals to the other conducting wires which are not within the predetermined distance of the induction coil so as to only supply alternating current signals to conducting wires that can induce an electromotive force in the induction coil. When it is detected that the induction coil is no longer within the predetermined distance of the conduction wire(s) supplied with the maximum signal amplitude (by analysing the changes in the properties of the alternating current signal supplied to the conducting wire), the control unit 630 can be configured to supply respective alternating current signals to the other conducting wires and perform the analysis of each of the respective alternating current signals to detect the presence or the absence of the induction coil within the predetermined distance of each of the conducting wires of the plurality of conducting wires. As such, when the robotic device 100, 260 remains stationary for a long period of time, the control unit 630 can be configured to supply alternating current signals to only the conducting wires within the predetermined distance of the robotic device 100, 260, which can transmit power to the induction coil. When the robotic device 100, 260 becomes active again, the array of conducting wires can be supplied with alternating current signals to enable analysis of the signals in order to detect the presence of the induction coil.

As the robotic device 100, 260 moves in the first and/or second direction defining the two-dimensional plane, such as from the point A to the point B illustrated in FIG. 10, the induction coil of the robotic device may move to within the predetermined distance of one or more conducting wires 1040, 1041, 1042, 1050, 1051, 1052 and alter the properties of the alternating current signals carried by the respective conducting wires. In response to detecting the presence of the induction coil within the predetermined distance of the conducting wire, in the first mode the processor 620 can be configured to periodically generate the control data comprising the binary indication for each conducting wire. For example, for a straight path from the point A to the point B illustrated in FIG. 10 the control data periodically generated by the processor 620 may be represented by the following table, where T1, T2, T3 and T4 represent consecutive timestamps associated with the generated control data:

| Wire ID | Control Data T1 | Control Data T2 | Control Data T3 | Control Data T4 |
|---|---|---|---|---|
| 1040 | N | N | Y | Y |
| 1041 | N | Y | N | N |
| 1042 | Y | N | N | N |
| 1050 | Y | N | N | N |
| 1051 | N | Y | N | N |
| 1052 | N | N | Y | Y |

In this example, control data with four respective timestamps is generated comprising a binary indication (e.g. Y or N corresponding to present or absent) for each conducting wire indicating whether or not the induction coil is within the predetermined distance of the conducting wire.

In the first mode, upon detecting the presence of the induction coil within the predetermined distance of a conduction wire, the process 620 can be configured to periodically generate the control data and the control unit 620 can control the respective alternating current signals supplied to each of the conducting wires based on the control data. Alternatively, in the second mode, the processor 620 may require a plurality of detections for the same conducting wire indicating the presence of the induction coil within the predetermined distance of that conducting wire for a period of time exceeding a predetermined time threshold prior to generating the control data. As such, in the second mode the processor 620 may be configured to generate control data with the timestamp T3 and T4 once a plurality of detections (see wire ID 1040 and wire ID 1052 at T3 and T4) for the same wire indicate the presence of the induction coil within the predetermined distance of that conducting wire.

In embodiments of the disclosure, the processor 620 is configured, based on the result of the detection, to predict a motion of the induction coil with respect to the power transmitting unit and to generate corresponding control data. The processor can detect the presence or the absence of the induction coil within the predetermined distance of each conducting wire the path of the robotic device 100, 260 can be predicted based on the previously detected states and the geometry of the plurality of conducting wires. For example, if the robotic device 100, 260 travels along a straight path with a distance exceeding a predetermined distance threshold then the processor 620 can be configured to calculate a predicted path for the robotic device 100, 260 and generate corresponding control data. Based on the previously detected states, the processor 620 may calculate the predicted path for the robotic device 100, 260 and the predicted velocity such that the time at which the robotic device will be within the predetermined distance of a conducting wire can be predicted. In this way, the processor 620 can generate the control data and the control unit 630 can control the respective signals supplied to the respective conducting wires based on the corresponding control data In embodiments of the disclosure, the charging apparatus 600 comprises a plurality of radio frequency identification readers in communication with the processor 620, wherein each radio frequency identification reader is disposed proximate to one or more portions of the conducting wire that are proximate to another conducting wire of the plurality of conducting wires, and wherein the processor 620 is configured to detect the presence or the absence of a radio frequency identification chip of the robotic device within the predetermined distance of the conducting wire based on a signal obtained from at least one radio frequency identification reader. The one or more radio frequency identification readers each comprise an antenna configured to receive modulated radio frequency signals emitted by one or more active or a passive radio frequency identification chips (RFID tags) included in the robotic device 100, 260. The antenna can receive the modulated radio frequency signals transmitted by the one or more radio frequency identification chips and communicate information to the processor 620 based on the properties of the received radio frequency signals. As such, the processor 620 can obtain signals from the radio frequency identification readers and identify when the robotic device 100, 260 is within the predetermined distance of the radio frequency identification reader disposed proximate to the one or more portions of the conducting wire. In this way, it is possible to detect when the robotic device 100, 260 is within the predetermined distance of the conducting wire based on a signal obtained from at least one radio frequency identification reader. The processor 620 can generate the control data based on the one or more signals obtained from the radio frequency identification readers and the control unit 630 can control at least one of the amplitude and the frequency of each respective alternating current signal supplied to each of the conducting wires based on the control data.

Each radio frequency identification reader can be disposed proximate (e.g. within a few cm) to a portion of a conducting wire that is proximate (e.g. within a few cm) to another conducting wire of the plurality of conducting wires. This means that a radio frequency identification reader can be positioned close to a portion of a conducting wire that crosses another conducting wire. For a grid type arrangement as shown in FIGS. 8, 9 and 10 (where one or more conducting wires extend in the first direction and one or more wires extend in the second direction) this means that at least one radio frequency identification reader can be disposed near each corner where the respective conducting wires cross each other in the two-dimensional plane, such that for the arrangement shown in FIG. 10 at least one radio frequency identification reader can be disposed proximate to each primary coil 670. In some examples, each primary coil 670 has a corresponding radio frequency identification reader. When the robotic device 100, 260, and thus the induction coil, is close to the primary coil 670 of the conducting wire, the corresponding radio frequency identification reader can detect the presence of the radio frequency identification chip and the processor 620 can generate the control data. Therefore, the control unit 630 can supply the respective alternating current signals to the respective wires in response to the detection by the radio frequency identification readers.

The one or more robotic devices 100, 260 may each comprise one or more radio frequency identification chips, wherein each radio frequency identification chip comprises an integrated circuit for storing identification information that is unique to the tag. The integrated circuit can be used to store the chip ID information (tag ID information) and modulate a radio frequency signal by superposing a signal comprising the chip ID information on to the radio frequency signal. The one or more radio frequency identification chips may be active, passive or battery-assisted passive tags. Each radio frequency identification chip can be configured to transmit the modulated radio frequency signal comprising the chip ID information. For example, the radio frequency identification chips may transmit a modulated radio frequency signal with a frequency in the range 120 kHz to 100 MHz, therefore allowing detection of the emitted signal by a radio frequency identification reader positioned up to 1 metre away from the radio frequency identification tag.

It will be appreciated that the frequency of the signal transmitted by the radio frequency identification chips, and thus the readable range of the transmitted signal, may be selected according to the dimensions of the charging apparatus 600 comprising the plurality of radio frequency identification readers. This means that the frequency of the radio signal may be selected based on the separation distance between the respective radio frequency identification readers disposed proximate to the conducting wires. For example, for a grid type arrangement as shown in FIGS. 8, 9 and 10 (where one or more conducting wires extend in the first direction and one or more wires extend in the second direction) for a separation of 1 metre between neighbouring conducting wires extending in the first direction, the frequency of the signal transmitted by the one or more radio frequency identification chips may be selected so that the signal can be read by a radio frequency identification reader positioned up to 0.5 metres away from the radio frequency identification chip. In some examples, the readable range of the radio frequency signal transmitted by the radio frequency identification tag may be selected to be less than or equal to half of the separation distance between neighbouring conducting wires extending in the same direction. In this way, the signals obtained by the processor 620 from the radio frequency identification readers can be used to determine, from the plurality of conducting wires, the two conducting wires that are closest to the induction coil of the robotic device 100, 260.

Figure 11:
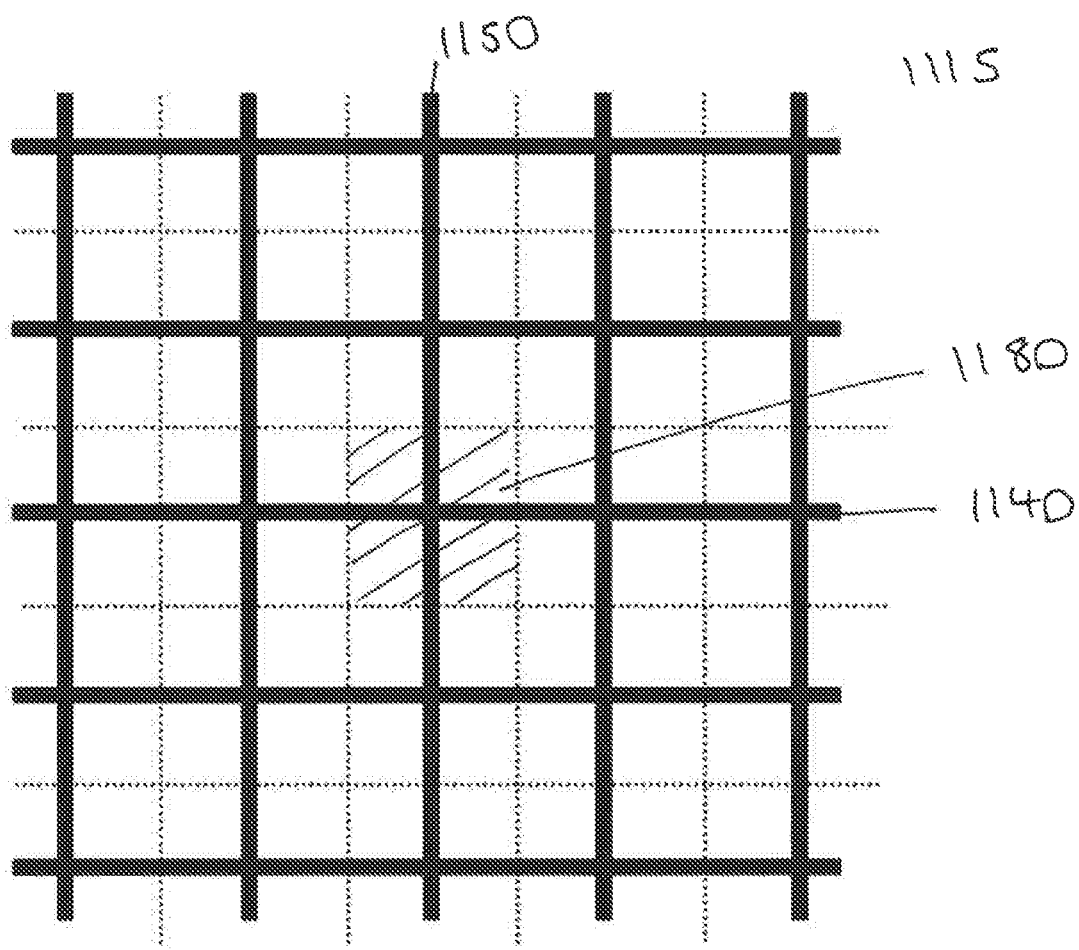
FIG. 11 schematically illustrates a plurality of planar tiles in accordance with embodiments of the present invention.

In embodiments of the disclosure, the power transmitting unit 610 comprises one or more planar tiles configured to be connected to one or more other planar tiles when arranged on substantially the same plane, and each planar tile comprises at least a portion of at least a first conducting wire extending in a first direction and at least a portion of at least a second conducting wire extending in a second direction. FIG. 11 illustrates a plurality of planar tiles 1180 each comprising at least a portion of at least a first conducting wire 1140 extending in a first direction and at least a portion of at least a second conducting wire 1150 extending in a second direction. The perimeter of each planar tile 1180 is represented by the dashed line in FIG. 11 and the central tile is shaded for illustrative purposes. A plurality of planar tiles 1180 are shown with respect to the plurality of conducting wires 1115 of the power transmitting unit 610. The planar tiles 1180 may be a carpet tile typically used for flooring purposed in a home or office environment (or similarly a ceramic tile, parquet tile or other flooring cover capable of tessellation). The conducting wires 1140, 1150 may be suitably insulated and either formed within the carpet tile or on the underside of the carpet tile such that the conducting wires are not visible when the carpet tile is in use. In some examples, the conducting wires may be formed within rubber or plastic tiles which can be arranged on a floor. The planar tiles 1180 may be arranged on a floor and positioned adjacent to each other as shown in FIG. 11 so that the planar tiles 1180 are arranged on the same two dimensional plane and the robotic device can be maneuvered across the upper surface of the planar tiles. Alternatively, the power transmitting unit 610 may comprise one planar tile comprising the plurality of conducting wires and the power transmitting unit 610 may be configured as a single entity.

In embodiments of the disclosure, when the one or more of the conducting wires 1140 extending in the first direction and the one or more of the conducting wires 1150 extending in the second direction are substantially orthogonal with respect to each other and on substantially the same plane, a positioning of each of the respective planar tiles is mutually interchangeable. The planar tiles 1180 may have a square shape as illustrated in FIG. 11 with each planar tile comprising a portion of a first conducting wire 1140 extending in a first direction and a portion of a second conducting wire 1150 orthogonal to the first wire. This means that each planar tile 1180 can be replaced with any other planar tile 1180 and the user may easily construct an array of the planar tiles 1180. As such, a planar tile can be swapped with another planar tile in the array of planar tiles, such that the positioning and/or orientation of planar tile is mutually interchangeable with another planar tile in the array of planar tiles.

A master planar tile may comprise the processor 620 and the control unit 630. The master planar tile can be provided at the perimeter of the array of planar tiles 1180 illustrated in FIG. 11 such that at least one side of the master planar tile is not connected to another planar tile. Alternatively or in addition, a base station may be provided which comprises the processor 620 and the control unit 630 and is connectable to at least one of the planar tiles 1080. The master planar tile can connect the charging apparatus 600 to the mains power supply via an electrical connection with a mains power outlet. The master tile can be configured to receive alternating current signals from each planar tile 1180 positioned at the perimeter of the array of the planar tiles. Therefore, the master tile can receive alternating current signals for each conducting wire of the plurality of conducting wires and the processor 620 can analyse the alternating current signals to detect the presence of the induction coil within the predetermined distance of any of the plurality of conducting wires.

In embodiments of the disclosure, optionally each planar tile comprises circuitry having either a first configuration or a second configuration in dependence upon a number of other planar tiles connected to the planar tile. The master tile can receive signals from a planar tile 1180, as illustrated in FIG. 11, having at least one of the four sides of the tile 1180 not connected to another tile (i.e. a perimeter tile). Each planar tile 1180 typically comprises grooves along the perimeter and circuitry which has a first configuration when all four sides of the planar tile 1180 are connected to other planar tiles and a second configuration when at least one side of the planar tile 1180 is not connected to another planar tile 1180. In other words, each planar tile 1180 can be connected to one or more other planar tiles 1180 when the planar tiles 1180 are arranged on substantially the same plane, and each planar tile comprises circuitry with a configuration that varies according to the number of planar tiles that the planar tile is connected to. In this way a tile having circuitry configured in a first configuration may indicate that the tile is not at the perimeter of the array of planar tiles, and a tile having circuitry configured in the second configuration may indicate that the tile is at the perimeter of the array of planar tiles. Any suitable alternative to grooves may also be considered, such as jigsaw-style connective lugs and recesses. It will be appreciated that such fittings may be only implemented in a lower part of the tile, so that the surface retains a conventional appearance.

When the respective tiles 1180 are connected with each other (slotted into place) the circuitry provided in each tile 1180 is such that the perimeter tiles 1180 form a ring which can communicate the alternating current signals carried by the conducting wires in each planar tile 1180 at the perimeter of the array to the master tile. In some examples, after assembling the array of planar tiles the user may place a cover over the one or more exposed electrical connections on the side of a perimeter tile that is not connected to another tile, and the presence of the one or more covers may configure the circuitry according to the first configuration such that the conductive ring is formed. The master tile can thus be electrically connected to each of the conducting wires via the conducting ring at the perimeter of the tile array. Hence the processor 620 can analyse the respective signals and the control unit 630 can control the respective signals supplied to the respective conducting wires.

It will be appreciated that each planar tile 1180 may comprise one or more primary coils 670 as discussed previously, and each planar tile 1180 may comprise one or more radio frequency identification readers as discussed previously.

Figure 12:
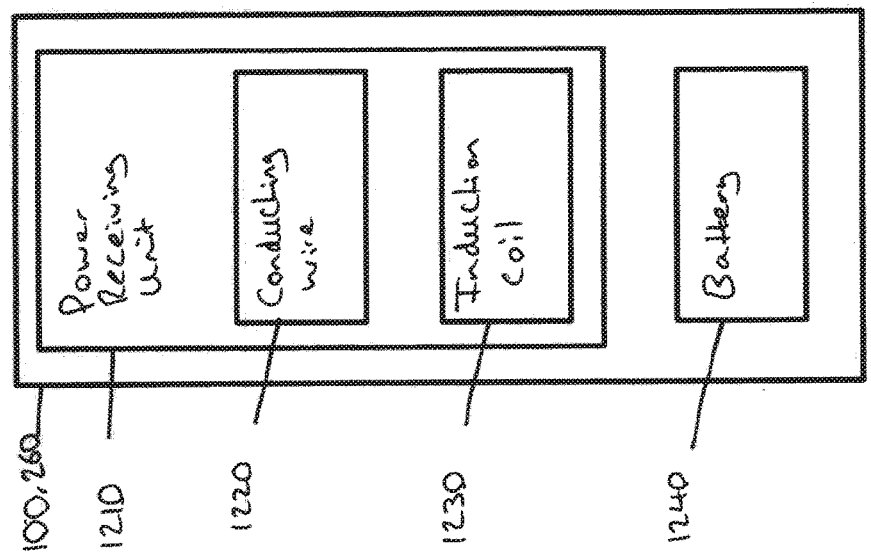
FIG. 12 is a schematic diagram illustrating a wirelessly chargeable robotic device, in accordance with embodiments of the present invention.

Referring now to FIG. 12, in embodiments of the disclosure a wirelessly chargeable robotic device 100, 260 comprises a power receiving unit 1210 comprising at least one conducting wire 1220 comprising at least one induction coil 1230 configured to wirelessly receive power transmitted by the charging apparatus 600, and a chargeable battery 1240 connected to the power receiving unit and configured to store the received power, wherein the charging apparatus 600 comprises a power transmitting unit 610 comprising a plurality of conducting wires each configured to carry a respective alternating current signal and to generate a time-varying magnetic flux when the conducting wire carries the alternating current signal, a processor 620 configured to detect a presence or an absence of the induction coil 1230 of the robotic device 100, 260 within a predetermined distance of a conducting wire and to generate control data based on the result of the detection, and a control unit 630 configured to control at least one of an amplitude and a frequency of each respective alternating current signal supplied to each of the conducting wires based on the control data, wherein the control unit 630 is configured to increase at least one of an amplitude and a frequency of an alternating current signal supplied to a conducting wire in response to control data indicating the presence of the induction coil within the predetermined distance of the conducting wire. The chargeable battery 1240 of the robotic device 100, 260 comprises one or more discrete battery cells. The robotic device 100, 260 comprises circuitry comprising a rectifier that is electrically connected to the induction coil 1230. The circuitry can be configured to rectify the alternating current signal induced in the induction coil and generate a direct current signal which can be used to charge the discrete battery cells of the battery 1240. As such, the robotic device 100, 260 can convert the alternating current signal to a regulated DC output which can be passed to the battery in order to charge the cells of the battery.

In embodiments of the disclosure, the power receiving unit 1210 of the robotic device 100, 260 is disposed within either a wheel or a lower limb of the robotic device 100, 260. For example, the power receiving unit 1210 may be positioned within a portion of at least one of the wheels 266a-d. In some examples, each wheel of the robotic device 100, 260 may comprise a power receiving unit 1210 comprising at least one induction coil 1230.

Figure 13:
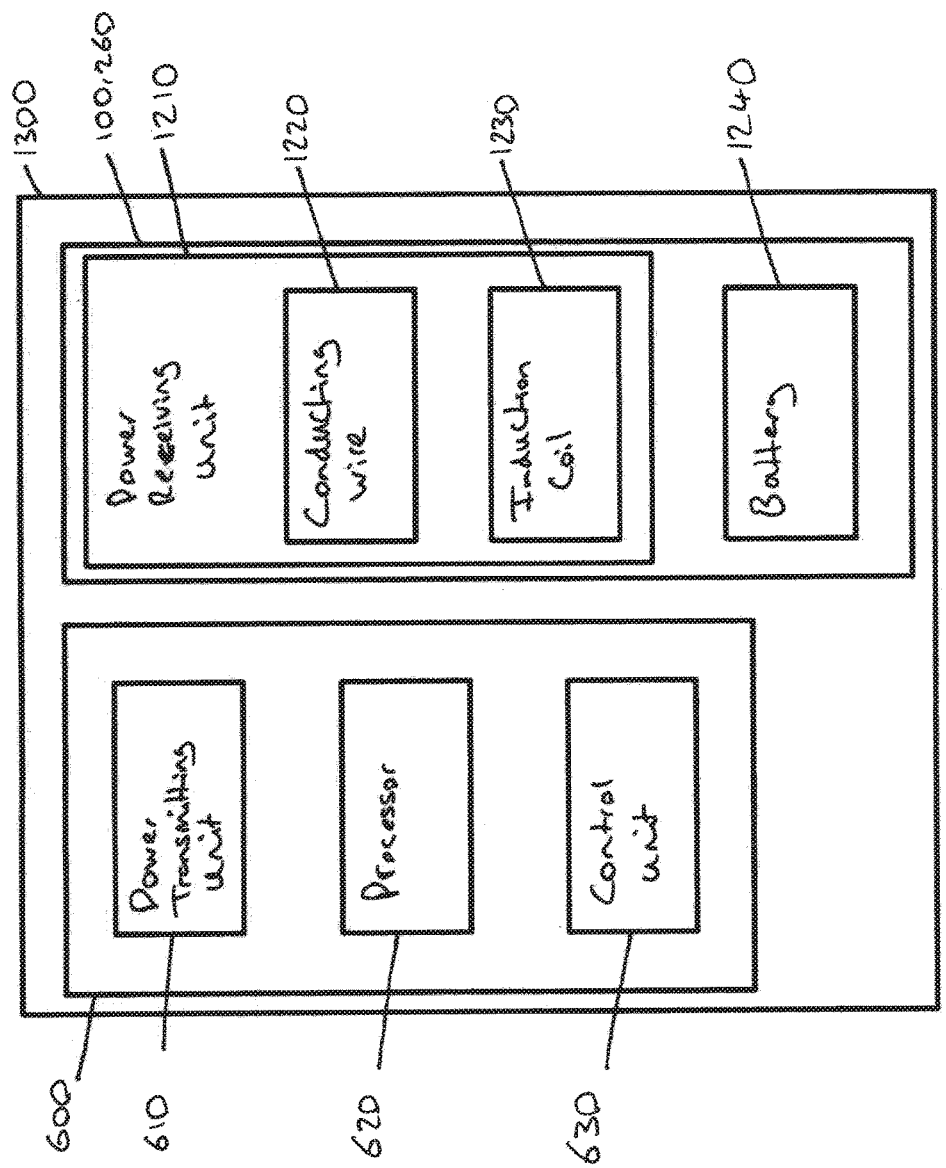
FIG. 13 is a schematic diagram illustrating a configuration of a system for wireless charging of one or more respective robotic devices, in accordance with embodiments of the present invention.

Referring now to FIG. 13, in embodiments of the disclosure a system 1300 for wireless charging of one or more respective robotic devices comprises the charging apparatus 600 for wireless charging of one or more robotic devices 100, 260, comprising a power transmitting unit 610 comprising a plurality of conducting wires each configured to carry a respective alternating current signal and to generate a time-varying magnetic flux when the conducting wire carries the alternating current signal, a processor 620 configured to detect a presence or an absence of an induction coil of a robotic device within a predetermined distance of a conducting wire and to generate control data based on the result of the detection, and a control unit 630 configured to control at least one of an amplitude and a frequency of each respective alternating current signal supplied to each of the conducting wires based on the control data, wherein the control unit 630 is configured to increase at least one of an amplitude and a frequency of an alternating current signal supplied to a conducting wire in response to control data indicating the presence of the induction coil within the predetermined distance of the conducting wire, and one or more wirelessly chargeable robotic devices 100, 260 comprising a power receiving unit 1210 comprising at least one conducting wire 1220 comprising at least one induction coil 1230 configured to wirelessly receive power transmitted by the charging apparatus 600, and a chargeable battery 1240 connected to the power receiving unit and configured to store the received power.

Figure 14:
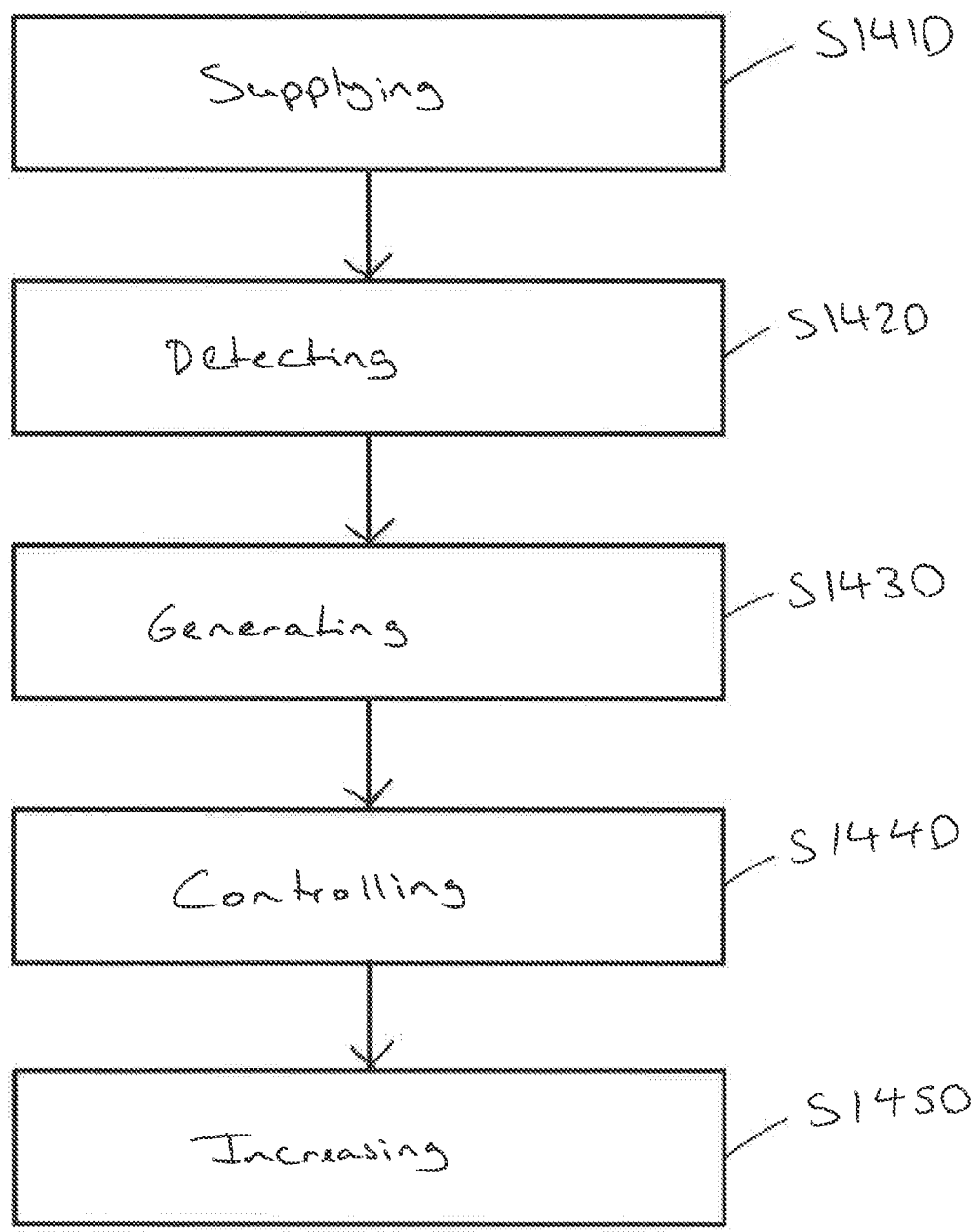
FIG. 14 is a flow diagram of a method of wirelessly charging one or more robotic devices, in accordance with embodiments of the present invention.

Referring now to FIG. 14, in embodiments of the disclosure a method of wirelessly charging one or more robotic devices comprises:

a first step S1410 of supplying a respective alternating current signal to each conducting wire of a plurality of conducting wires and generating a time-varying magnetic flux when a conducting wire carries the alternating current signal;

a second step S1420 of detecting a presence or an absence of an induction coil of a robotic device within a predetermined distance of a conducting wire;

a third step S1430 of generating control data based on the result of the detection;

a fourth step S1440 of controlling at least one of an amplitude and a frequency of each respective alternating current signal supplied to each conducting wire of the plurality of conducting wires based on the control data; and a fifth step S1450 of increasing at least one of an amplitude and a frequency of an alternating current signal supplied to a conducting wire in response to control data indicating the presence of the induction coil within the predetermined distance of the conducting wire.

It will be apparent to a person skilled in the art that variations in the above method corresponding to operation of the various embodiments of the system as described and claimed herein are considered within the scope of the present invention. It will be appreciated that example embodiments can be implemented by computer software operating on a general purpose computing system such as a games machine or a computing system provided as part of a robotic device. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practiced otherwise than as specifically described herein.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A charging apparatus for wireless charging of one or more robotic devices, comprising:
a power transmitting unit comprising a plurality of conducting wires each configured to carry a respective alternating current signal and to generate a time-varying magnetic flux when the conducting wire carries the alternating current signal;
a processor configured to detect a presence or an absence of an induction coil of a robotic device within a predetermined distance of a conducting wire and to generate control data based on the result of the detection; and
a control unit configured to control at least one of an amplitude and a frequency of each respective alternating current signal supplied to each of the conducting wires based on the control data, wherein the control unit is configured to increase at least one of an amplitude and a frequency of an alternating current signal supplied to a conducting wire in response to control data indicating the presence of the induction coil within the predetermined distance of the conducting wire, wherein:
the plurality of conducting wires comprises one or more planar tiles configured to be connected to one or more other planar tiles when arranged on substantially the same plane,
each planar tile comprises at least a portion of at least a first conducting wire extending in a first direction and at least a portion of at least a second conducting wire extending in a second direction, and
each planar tile comprises circuitry having either a first configuration or a second configuration in dependence upon a number of other planar tiles connected to the planar tile.

2. A charging apparatus according to claim 1, wherein the plurality of conducting wires comprises one or more conducting wires extending in a first direction and one or more conducting wires extending in a second direction, the first direction and the second direction defining a plane on which the conducting wires are arranged.

3. A charging apparatus according to claim 1, wherein the processor is configured to detect the presence or the absence of the induction coil within the predetermined distance of the conducting wire based on an analysis of the alternating current signal carried by the conducting wire.

4. A charging apparatus according to claim 1, wherein each conducting wire comprises one or more primary coils each configured to generate the time-varying magnetic flux when the conducting wire carries the alternating current signal.

5. A charging apparatus according to claim 4, wherein for each conducting wire the one or more primary coils are disposed at one or more portions of the conducting wire that are proximate to another conducting wire of the plurality of conducting wires.

6. A charging apparatus according to claim 5, wherein the control unit is configured to increase at least one of an amplitude and a frequency of an alternating current signal supplied to a first conducting wire in response to control data indicating the presence of the induction coil within the predetermined distance of the first conducting wire and to decrease at least one of an amplitude and a frequency of an alternating current signal supplied to a second conducting wire in response to control data indicating the absence of the induction coil within the predetermined distance of the second conducting wire.

7. A charging apparatus according to claim 1, wherein the processor is configured to generate the control data indicating the presence of the induction coil within the predetermined distance of the conducting wire in response to detecting the presence of the induction coil within the predetermined distance of the conducting wire for a period of time exceeding a predetermined time threshold.

8. A charging apparatus according to claim 1, comprising: a plurality of radio frequency identification readers in communication with the processor, wherein each radio frequency identification reader is disposed proximate to one or more portions of the conducting wire that are proximate to another conducting wire of the plurality of conducting wires, and wherein the processor is configured to detect the presence or absence of a radio frequency identification chip of the robotic device within the predetermined distance of the conducting wire based on a signal obtained from at least one radio frequency identification reader.

9. A charging apparatus according to claim 1, wherein the first direction and the second direction are substantially orthogonal with respect to each other and on substantially the same plane, and a positioning of each of the respective planar tiles is mutually interchangeable.

10. A charging apparatus according to claim 1, wherein the processor is configured, based on the result of the detection, to predict a motion of the induction coil with respect to the power transmitting unit and to generate corresponding control data.

11. A charging apparatus according to claim 2, wherein the plurality of conducting wires comprises at least a third conducting wire extending in the first direction and a fourth conducting wire extending in the second direction, the first conducting wire and the third conducting wire being separated by a first predetermined distance and the second conducting wire and the fourth conducting wire being separated by a second predetermined distance, the first predetermined distance being greater than or equal to the second predetermined distance in a manner such that the plurality of wires define a grid.

12. A wirelessly chargeable robotic device, comprising:
a power receiving unit comprising at least one conducting wire comprising at least one induction coil configured to wirelessly receive power transmitted by a charging apparatus; and
a chargeable battery connected to the power receiving unit and configured to store the received power, wherein the charging apparatus includes:
a power transmitting unit comprising a plurality of conducting wires each configured to carry a respective alternating current signal and to generate a time-varying magnetic flux when the conducting wire carries the alternating current signal;
a processor configured to detect a presence or an absence of an induction coil of a robotic device within a predetermined distance of a conducting wire and to generate control data based on the result of the detection; and
a control unit configured to control at least one of an amplitude and a frequency of each respective alternating current signal supplied to each of the conducting wires based on the control data, wherein the control unit is configured to increase at least one of an amplitude and a frequency of an alternating current signal supplied to a conducting wire in response to control data indicating the presence of the induction coil within the predetermined distance of the conducting wire, wherein:
the plurality of conducting wires comprises one or more planar tiles configured to be connected to one or more other planar tiles when arranged on substantially the same plane,
each planar tile comprises at least a portion of at least a first conducting wire extending in a first direction and at least a portion of at least a second conducting wire extending in a second direction, and
each planar tile comprises circuitry having either a first configuration or a second configuration in dependence upon a number of other planar tiles connected to the planar tile.

13. A wirelessly chargeable robotic device according to claim 12, wherein the power receiving unit is disposed within either a wheel or a lower limb of the robotic device.

14. A method of wirelessly charging one or more robotic devices, comprising:
supplying a respective alternating current signal to each conducting wire of a plurality of conducting wires and generating a time-varying magnetic flux when a conducting wire carries the alternating current signal;
detecting a presence or an absence of an induction coil of a robotic device within a predetermined distance of a conducting wire;
generating control data based on the result of the detection;
controlling at least one of an amplitude and a frequency of each respective alternating current signal supplied to each conducting wire of the plurality of conducting wires based on the control data; and
increasing at least one of an amplitude and a frequency of an alternating current signal supplied to a conducting wire in response to control data indicating the presence of the induction coil within the predetermined distance of the conducting wire, wherein:
the plurality of conducting wires comprises one or more planar tiles configured to be connected to one or more other planar tiles when arranged on substantially the same plane,
each planar tile comprises at least a portion of at least a first conducting wire extending in a first direction and at least a portion of at least a second conducting wire extending in a second direction, and
each planar tile comprises circuitry having either a first configuration or a second configuration in dependence upon a number of other planar tiles connected to the planar tile.

15. A non-transitory, computer readable storage medium containing computer software which, when executed by a computer, causes the computer to carry out a method of wirelessly charging one or more robotic devices actions, the method comprising:
supplying a respective alternating current signal to each conducting wire of a plurality of conducting wires and generating a time-varying magnetic flux when a conducting wire carries the alternating current signal;
detecting a presence or an absence of an induction coil of a robotic device within a predetermined distance of a conducting wire;
generating control data based on the result of the detection;
controlling at least one of an amplitude and a frequency of each respective alternating current signal supplied to each conducting wire of the plurality of conducting wires based on the control data; and
increasing at least one of an amplitude and a frequency of an alternating current signal supplied to a conducting wire in response to control data indicating the presence of the induction coil within the predetermined distance of the conducting wire, wherein:
the plurality of conducting wires comprises one or more planar tiles configured to be connected to one or more other planar tiles when arranged on substantially the same plane,
each planar tile comprises at least a portion of at least a first conducting wire extending in a first direction and at least a portion of at least a second conducting wire extending in a second direction, and
each planar tile comprises circuitry having either a first configuration or a second configuration in dependence upon a number of other planar tiles connected to the planar tile.

* * * * *